United States Patent
Komatsu et al.

(10) Patent No.: US 9,452,532 B2
(45) Date of Patent: Sep. 27, 2016

(54) ROBOT, DEVICE AND METHOD FOR CONTROLLING ROBOT, AND COMPUTER-READABLE NON-TRANSITORY RECORDING MEDIUM

(71) Applicant: Panasonic Intellectual Property Management Co., Ltd., Osaka (JP)

(72) Inventors: Mayumi Komatsu, Kyoto (JP); Yasunao Okazaki, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 52 days.

(21) Appl. No.: 14/590,223

(22) Filed: Jan. 6, 2015

(65) Prior Publication Data

US 2015/0209961 A1 Jul. 30, 2015

(30) Foreign Application Priority Data

Jan. 27, 2014 (JP) .................................. 2014-011945

(51) Int. Cl.
*G05B 19/04* (2006.01)
*G05B 19/18* (2006.01)
*B25J 9/16* (2006.01)

(52) U.S. Cl.
CPC .... *B25J 9/1676* (2013.01); *G05B 2219/39082* (2013.01); *G05B 2219/39209* (2013.01); *G05B 2219/40202* (2013.01); *Y10S 901/02* (2013.01); *Y10S 901/46* (2013.01); *Y10S 901/49* (2013.01)

(58) Field of Classification Search
CPC .. B25J 9/1676; Y10S 901/02; Y10S 901/49; Y10S 901/46; G05B 2219/40202; G05B 2219/39209; G05B 2219/39082

USPC .................................................. 700/245, 255
See application file for complete search history.

(56) References Cited

U.S. PATENT DOCUMENTS

| 8,280,552 B2 | 10/2012 | Takesue et al. |
| 8,396,594 B2* | 3/2013 | Okazaki ............... G05B 19/423 318/100 |
| 2009/0105880 A1 | 4/2009 | Okazaki |

FOREIGN PATENT DOCUMENTS

| JP | 63-123682 A | 5/1988 |
| JP | 1-310889 A | 12/1989 |
| JP | 11-277483 | 10/1999 |
| JP | 2009-066696 | 4/2009 |
| WO | 2007/080733 | 7/2007 |
| WO | 2011/080856 | 7/2011 |

* cited by examiner

*Primary Examiner* — Jaime Figueroa
(74) *Attorney, Agent, or Firm* — Wenderoth, Lind & Ponack, L.L.P.

(57) ABSTRACT

A robot determines whether or not an operator or an object is jammed between a robot arm and an external structure, classifies an area in which an end portion of the robot arm moves into a restricted area and an unrestricted area, and sets a restriction period. If a period after detection of the jam is in the restriction period and the end portion is in the restricted area, restriction on movement is imposed on one or more joints of the robot arm. The restriction on movement is a stoppage of movement of one or more joints. If the period after detection of the jam is after the restriction period, the restriction on movement is removed. If the period after detection of the jam is in the restriction period and the end portion is in the unrestricted area, the restriction on movement is not imposed on the joints.

15 Claims, 14 Drawing Sheets

FIG. 6A

| FIRST JOINT | | SECOND JOINT | | THIRD JOINT | | FOURTH JOINT | | FIFTH JOINT | | SIXTH JOINT | |
|---|---|---|---|---|---|---|---|---|---|---|---|
| + | − | + | − | + | − | + | − | + | − | + | − |
| 0 | 1 | 0 | 0 | 0 | 0 | 0 | 0 | 0 | 0 | 0 | 0 |

FIG. 6B

| FIRST JOINT | | SECOND JOINT | | THIRD JOINT | | FOURTH JOINT | | FIFTH JOINT | | SIXTH JOINT | |
|---|---|---|---|---|---|---|---|---|---|---|---|
| + | − | + | − | + | − | + | − | + | − | + | − |
| 0 | 0 | 0 | 0 | 0 | 0 | 0 | 0 | 0 | 0 | 0 | 0 |

FIG. 9

| TIME | $t_0$ | $t_1$ | $t_2$ | ... | $t_n$ | $t_{n+1}$ | $t_{n+2}$ | $t_{n+3}$ |
|---|---|---|---|---|---|---|---|---|
| POSITION | $x_0$ | $x_1$ | $x_2$ | ... | $x_n$ | $x_{n+1}$ | $x_{n+2}$ | $x_{n+3}$ |
| | $y_0$ | $y_1$ | $y_2$ | ... | $y_n$ | $y_{n+1}$ | $y_{n+2}$ | $y_{n+3}$ |
| | $z_0$ | $z_1$ | $z_2$ | ... | $z_n$ | $z_{n+1}$ | $z_{n+2}$ | $z_{n+3}$ |
| VELOCITY | $\omega_0$ | $\omega_1$ | $\omega_2$ | ... | $\omega_n$ | $\omega_{n+1}$ | $\omega_{n+2}$ | $\omega_{n+3}$ |
| RESTRICTED AREA | 0 | 0 | 0 | ... | 0 | 1 | 1 | 1 |

RESTRICTION PERIOD (sec)

| | | JAMMED BODY | |
| --- | --- | --- | --- |
| | | OBJECT | OPERATOR |
| FORCE GENERATED DUE TO JAM | LARGE | 3 | 1 |
| | SMALL | 5 | 2 |

ROBOT, DEVICE AND METHOD FOR CONTROLLING ROBOT, AND COMPUTER-READABLE NON-TRANSITORY RECORDING MEDIUM

BACKGROUND

1. Technical Field

The present disclosure relates to a power-assist robot that performs an operation in cooperation with an operator, a device and a method for controlling a robot, and a computer-readable non-transitory recording medium.

2. Description of the Related Art

In recent years, domestic robots, such as caregiver robots and housekeeper robots, have been actively developed. Moreover, industrial robots that cooperate with operators have been actively developed as a result of, for example, cellular manufacturing factories having become widespread (see Japanese Unexamined Patent Application Publication No. 11-277483 and WO2007/080733).

SUMMARY

An increased safety is needed for robots described above, which cooperate with operators, because they operate in spaces in which operators work, in contrast to existing industrial robots or the like, which operate in work areas that are separated from those for operators.

One non-restricting and exemplary embodiment provides a power-assist robot that can cooperate with operators with a higher level of safety as compared with existing industrial robots or the like.

Additional benefits and advantages of the disclosed embodiments will be apparent from the specification and figures. The benefits and/or advantages may be individually provided by the various embodiments and features of the specification and drawings disclosure, and need not all be provided in order to obtain one or more of the same.

In one general aspect, the techniques disclosed here feature a robot including a position information obtaining unit that obtains position information about an end portion of a robot arm having a plurality of joints, a first force detector that detects a force that an operator applies to the robot arm, a jam determination unit that determines whether or not the operator or an object is jammed between the robot arm and an external structure on the basis of the force detected by the first force detector, an area classification unit that classifies an area in which the end portion moves into a restricted area and an unrestricted area, and a restriction period setting unit that sets a restriction period during which movement of the robot arm is restricted. If a period after detection of the jam is in the restriction period and the end portion is located in the restricted area, restriction on movement is imposed on one or more of the joints and the restriction on movement is not imposed on at least one of the joints excluding the one or more of the joints. The restriction on movement is a stoppage of movement of one or more of the plurality of joints. If the period after detection of the jam is after the restriction period, the restriction on movement is removed. If the period after detection of the jam is in the restriction period and the end portion is located in the unrestricted area, the restriction on movement is not imposed on the plurality of joints.

Note that general or specific aspects including the above-described aspect may be implemented in a form of a system, a method, an integrated circuit, a computer program, or a computer-readable recording medium, such as a compact disk read-only memory (CD-ROM), or may be implemented using any combination of a system, a method, an integrated circuit, a computer program, and a recording medium.

With the aspect of the present disclosure, it is possible to provide a power-assist robot that performs an operation in corporation with an operator and that can move so as to allow the operator to safely get out of a jammed state while giving consideration to the effect on an external structure.

BRIEF DESCRIPTION OF THE DRAWINGS

FIG. 6A illustrates an example of restricted directions stored in a directional area classification unit according to the first embodiment of the present disclosure.

FIG. 6B illustrates an example of restricted directions stored in the directional area classification unit according to the first embodiment of the present disclosure.

FIG. 9 illustrates an example of an operation performed by the area classification unit according to the second embodiment of the present disclosure.

DETAILED DESCRIPTION

Basic Findings

Figures 12, 13:
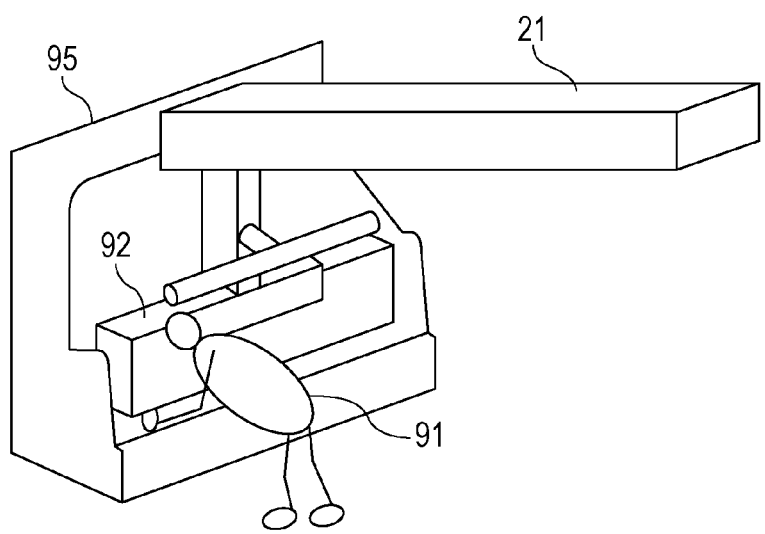
FIG. 12 illustrates an example of an operator who is in a jammed state described in the "Basic Findings" section of the present disclosure.
FIG. 13 is a table showing an example of an algorithm of a restriction period setting unit according to the first embodiment of the present disclosure.

For example, existing power-assist robots that are used to move an object in corporation with an operator can be also used to perform a simple operation of mounting the object in another object. In this case, it is likely that an object is moved not only through an empty space but also through a space in which another object, into which the object is to be mounted, is placed. Even if the safety of the robot is increased, it may happen that an operator is exposed to some danger. Examples of the danger include a case where an operator becomes jammed between the robot or an object moved by the robot and an external structure. For example, FIG. 12 illustrates a case where an operator 91 uses a power-assist robot to mount an object 92, which is held by a robot arm 21, in a surrounding object 95. In the final step, the operator 91 may release his/her hand from the robot arm 21 and may directly touch the object 92 in order to adjust the position of the object 92. At this time, the hand of the operator 91 may become jammed between the object 92 and the surrounding object 95.

Unfortunately, the technology disclosed in Japanese Unexamined Patent Application Publication No. 11-277483 has a problem in that the technology does not effectively ensure the safety of an operator, because only the wrist axis is movable and therefore an operator might not be able to get out of a jammed state. Even when not only the wrist axis but also the main axis is movable, because the range of movement of the robot, including the main axis and the wrist axis, is small, an operator might not be able to smoothly get out of a jammed state in which, for example, his/her hand is jammed. With the technology disclosed in WO2007/080733, when the robot is used in a small space and if a hand of an operator becomes jammed, the operator might not be able to get out of a jammed state because the space in which the operator can move may be limited. When the robot arm is moved only in a movable direction and in a predetermined direction, an operator might not be able to get out of a jammed state. In such a case, for safety of the operator, a control device for controlling the robot needs to give priority to an operation that allows the operator to get out of a jammed state over consideration on the effect on the external structure. However, existing control devices are not capable of performing such an operation.

The present disclosure provides a power-assist robot that performs an operation in corporation with an operator, a device and a method for controlling a robot, and a computer-readable non-transitory recording medium that are capable of ensuring an increased level of safety as compared with existing industrial robots or the like. To be specific, the robot can operate so as to allow an operator to rapidly and safely get out of a jammed state while giving consideration to the effect on the external structure.

Aspects of the present disclosure will be described below, before describing embodiments of the present disclosure with reference to the drawings.

A first aspect provides a robot including a position information obtaining unit that obtains position information about an end portion of a robot arm having a plurality of joints, a first force detector that detects a force that an operator applies to the robot arm, a jam determination unit that determines whether or not the operator or an object is jammed between the robot arm and an external structure on the basis of the force detected by the first force detector, an area classification unit that classifies an area in which the end portion moves into a restricted area and an unrestricted area, and a restriction period setting unit that sets a restriction period during which movement of the robot arm is restricted. If a period after detection of the jam is in the restriction period and the end portion is located in the restricted area, restriction on movement is imposed on one or more of the plurality of joints and the restriction on movement is not imposed on at least one of the plurality of joints excluding the one or more of the plurality of joints. The restriction on movement is a stoppage of movement of one or more of the plurality of joints. If the period after detection of the jam is after the restriction period, the restriction on movement is removed. If the period after detection of the jam is in the restriction period and the end portion is located in the unrestricted area, the restriction on movement is not imposed on the plurality of joints.

According to the first aspect, the robot, which is a power-assist robot that performs an operation in corporation with an operator, can move so as to allow the operator to safely get out of a jammed state while giving consideration to the effect on the external structure.

A second aspect provides the robot according to the first aspect, further including a second force detector that detects an external force that the robot arm receives from the outside. The jam determination unit determines that the operator or the object is jammed between the robot arm and the external structure on the basis of the force detected by the first force detector and the external force that the robot arm receives from the outside and that is detected by the second force detector. If the jam determination unit determines that a jam has occurred, movement of the robot arm is controlled on the basis of the external force that the robot arm receives from the outside and that is detected by the second force detector.

According to the second aspect, the robot can move so as to allow the operator to safely get out of a jammed state because a jam can be detected and the robot can be moved without fail even if the jam occurs in a place where the first force detector cannot detect a force.

A third aspect provides the robot according to the second aspect, in which the area classification unit stores a map of an operation area including the restricted area beforehand.

According to the third aspect, the robot can move so as to allow the operator to safely get out of a jammed state while giving consideration to the effect on the external structure because a restricted area can be determined by using the map.

A fourth aspect provides the robot according to the second aspect, in which the area classification unit obtains a velocity of movement of the end portion and classifies an area in which the velocity of movement of the end portion is lower than a velocity threshold into the restricted area.

According to the fourth aspect, without determining a restricted area beforehand, the area classification unit can determine a restricted area and an unrestricted area by using the velocity of movement of the end portion. In the restricted area, restriction is imposed on the direction in which the robot arm is moved, and the restriction period setting unit allows the robot arm to be moved in any direction after the elapse of a certain restriction period. Thus, because the area classification unit estimates the effect on the external structure from the velocity of movement of the end portion and determines a restricted range (area) or an unrestricted range (area), it is possible to realize control even if a map of an operation area is not stored beforehand.

A fifth aspect provides the robot according to the third aspect, in which the restricted area includes a plurality of areas, and in which the area classification unit is a directional area classification unit that has information about a direction in which movement of each of the plurality of joints is restricted in each of the plurality of areas.

According to the fifth aspect, the robot can move so as to allow the operator to more safely get out of a jammed state while giving consideration to the effect on the external structure, because it is possible to restrict only a direction specified for each of the plurality of areas.

A sixth aspect provides the robot according to the fifth aspect, in which one or more of the plurality of joints on which the restriction on movement is to be imposed are determined on the basis of information about the plurality of areas and information about the direction in which movement of each of the plurality of joints is to be restricted, which are stored in the directional area classification unit.

According to the sixth aspect, the robot can move so as to allow the operator to get out of a jammed state while giving consideration to the effect on the external structure, because it is possible to restrict only joints to be restricted in corresponding restricted areas.

A seventh aspect provides the robot according to the first aspect, in which the restriction on movement is not imposed on at least one of the plurality of joints near the end portion.

According to the seventh aspect, the robot can move so as to allow the operator to get out of a jammed state while giving consideration to the external structure, because it is possible to restrict only joints to be restricted in corresponding restricted areas and because at least one of the joints near the end portion is not restricted.

An eighth aspect provides the robot according to the second aspect, in which the restriction period setting unit sets a shorter restriction period when the external force detected by the second force detector is larger.

According to the eighth aspect, the robot can move so as to allow the operator to safely get out of a jammed state, because, when a large external force is applied, the robot recognizes that it is necessary to urgently allow the operator to get out of the jammed state and removes the restriction in a short time.

A ninth aspect provides the robot according to the second aspect, further including an operator/object determination unit. The operator/object determination unit determines whether a body jammed between the end portion of the robot arm and the external structure is the operator or the object on the basis of the position information obtained by the position information obtaining unit, the external force that the robot arm receives from the outside and that is detected by the second force detector, and information determined by the jam determination unit. If the operator/object determination unit determines that the body is the operator, the restriction period setting unit sets the restriction period to be shorter than that in a case where the operator/object determination unit determines that the body is the object.

According to the ninth aspect, it is possible to set a short restriction period if the operator/object determination unit determines that the operator has been jammed and to set a long restriction period if the operator/object determination unit determines that the object has been jammed. Therefore, if a jam occurs, by performing force control so that the object held by the end portion of the robot arm might not collide with an external structure or the like, it is possible to control the robot arm to be moved in such a direction that allows the operator or the object that has been jammed to get out of a jammed state. Moreover, the robot can move while ensuring a higher safety of an operator.

A tenth aspect provides the robot according to the ninth aspect, in which the second force detector estimates an estimated joint torque from a value of an electric current passing through a driving device of each of the joints and position information obtained by the position information obtaining unit, in which the operator/object determination unit calculates an elastic modulus from the position information obtained by the position information obtaining unit and the estimated joint torque estimated by the second force detector, and in which the operator/object determination unit determines that the body that is jammed is the operator if the calculated elastic modulus is less than a first operator-determination threshold and determines that the body that is jammed is the object if the calculated elastic modulus is greater than or equal to the first operator-determination threshold.

According to the tenth aspect, it is possible to set a short restriction period if the operator/object determination unit determines that the operator has been jammed and to set a long restriction period if the operator/object determination unit determines that the object has been jammed. Therefore, if a jam occurs, by performing force control so that the object held by the end portion of the robot arm might not collide with an external structure or the like, it is possible to control the robot arm to be moved in such a direction that allows the operator or the object that has been jammed to get out of a jammed state. Moreover, the robot can move while ensuring a higher safety of an operator.

An eleventh aspect provides the robot according to the ninth aspect, in which the operator/object determination unit determines that the body that is jammed is the operator if a difference between a maximum value and a minimum value of the external force that the robot arm receives from the outside and that is detected by the second force detector is greater than or equal to a second operator-determination threshold.

According to the eleventh aspect, it is possible to set a short restriction period if the operator/object determination unit determines that the operator has been jammed and to set a long restriction period if the operator/object determination unit determines that the object has been jammed. Therefore, if a jam occurs, by performing force control so that the object held by the end portion of the robot arm might not collide with an external structure or the like, it is possible to control the robot arm to be moved in such a direction that allows the operator or the object that has been jammed to get out of a jammed state. Moreover, the robot can move while ensuring a higher safety of an operator.

A twelfth aspect provides the robot according to the eighth aspect, in which the jam determination unit determines that a jam has occurred if an input from the first force detector is zero and an input from the second force detector is greater than or equal to a certain value.

According to the twelfth aspect, the robot can move so as to allow the operator to safely get out of a jammed state because a jam can be detected and the robot can be moved without fail even if the jam occurs in a place where the first force detector cannot detect a force. Moreover, if the first force detector can detect a force, with an ordinary movement, the robot can perform an operation that allows the operator to safely get out of a jammed state. Therefore, the robot can move so as to allow the operator to more safely get out of a jammed state while giving consideration to the effect on the external structure.

A thirteenth aspect provides a device for controlling a robot, the device including a position information obtaining unit that obtains position information about an end portion of a robot arm having a plurality of joints, a first force detector that detects a force that an operator applies to the robot arm, a jam determination unit that determines whether or not the operator or an object is jammed between the robot arm and an external structure on the basis of the force detected by the first force detector, an area classification unit that classifies an area in which the end portion moves into a restricted area and an unrestricted area, and a restriction period setting unit that sets a restriction period during which movement of the robot arm is restricted. If a period after detection of the jam is in the restriction period and the end portion is located in the restricted area, restriction on movement is imposed on one or more of the plurality of joints and the restriction on movement is not imposed on at least one of the plurality of joints excluding the one or more of the plurality of joints. The restriction on movement is a stoppage of movement of one or more of the plurality of joints. If the period after detection of the jam ends after the restriction period, the restriction on movement is removed. If the period after detection of the jam is in the restriction period and the end portion is located in the unrestricted area, the restriction on movement is not imposed on the plurality of joints.

According to the thirteenth aspect, the robot control device, which is control device for a power-assist robot that performs an operation in corporation with an operator, allows the operator to safely get out of a jammed state while giving consideration to the effect on the external structure.

A fourteenth aspect provides a method for controlling a robot, the method including a step of obtaining position information about an end portion of a robot arm having a plurality of joints, a step of detecting a force that an operator applies to the robot arm, a step of determining whether or not the operator or an object is jammed between the robot arm and an external structure on the basis of the detected force, a step of classifying an area in which the end portion moves into a restricted area and an unrestricted area, and a step of setting a restriction period during which movement of the robot arm is restricted. If a period after detection of the jam is in the restriction period and the end portion is located in the restricted area, restriction on movement is imposed on one or more of the plurality of joints and the restriction on movement is not imposed on at least one of the plurality of joints excluding the one or more of the plurality of joints. The restriction on movement is a stoppage of movement of one or more of the plurality of joints. If the period after detection of the jam is after the restriction period, the restriction on movement is removed. If the period after detection of the jam is in the restriction period and the end portion is located in the unrestricted area, the restriction on movement is not imposed on the plurality of joints.

According to the fourteenth aspect, the method for controlling a robot, which is method for controlling a power-assist robot that performs an operation in corporation with an operator, allows the operator to safely get out of a jammed state while giving consideration to the effect on the external structure.

A fifteenth aspect provides a computer-readable non-transitory recording medium storing a program for causing a computer to perform the method for controlling a robot according to the fourteenth aspect.

According to the fifteenth aspect, the computer-readable non-transitory recording medium storing a control program, which is a control program for controlling a power-assist robot that performs an operation in corporation with an operator, allows the operator to safely get out of a jammed state giving consideration to the effect on the external structure.

Hereinafter, embodiments according to the present disclosure will be described in detail with reference to the drawings.

First Embodiment

Figure 1:
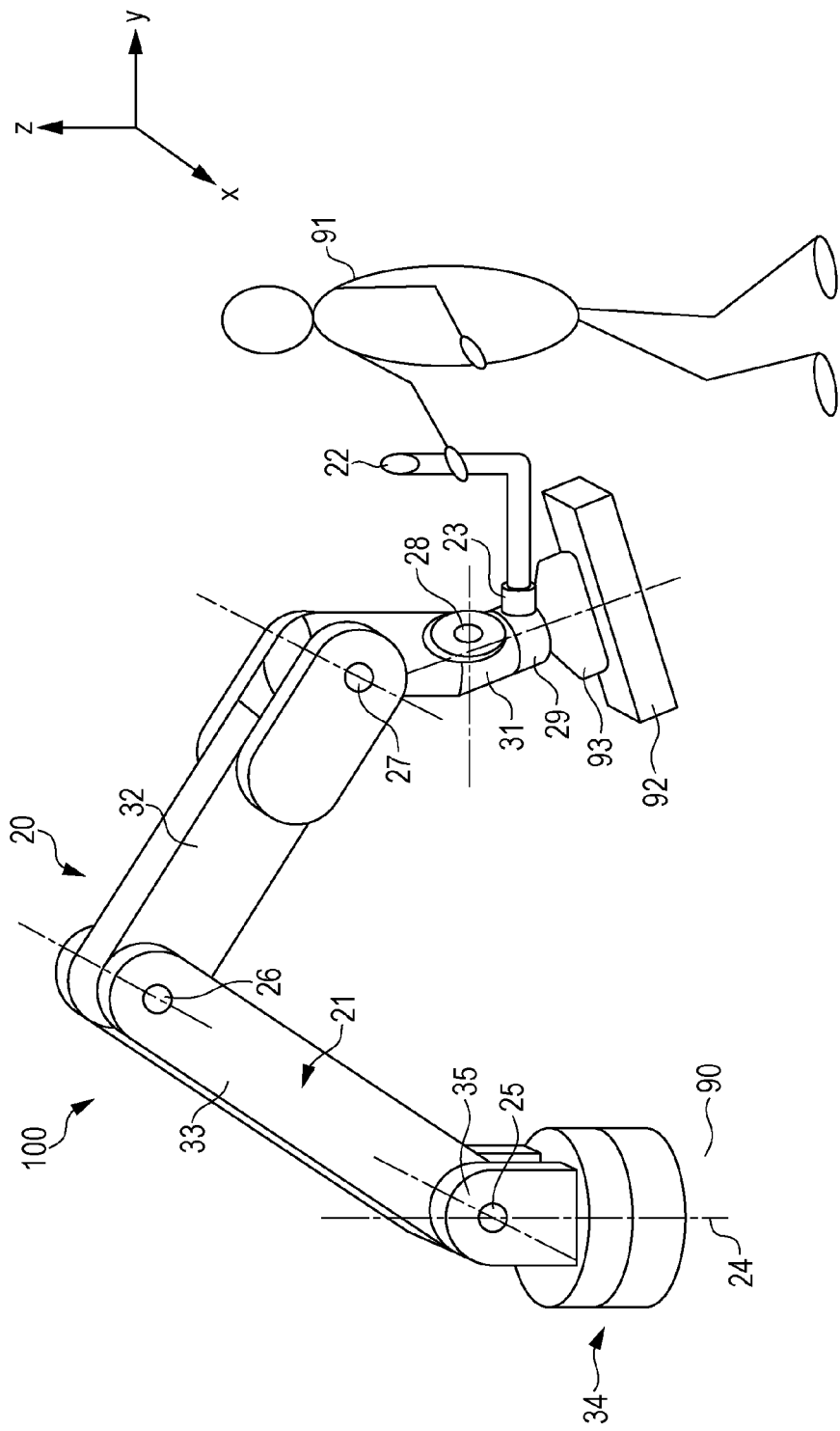
FIG. 1 is a schematic view of a robot system according to a first embodiment of the present disclosure.

FIG. 1 is a schematic view of a robot system 100 according to the first embodiment of the present disclosure.

A robot 20 of the robot system 100 includes a robot arm 21 and a handle 22 attached to an end portion of the robot arm 21. The handle 22 is used when an operator 91 applies a force to the robot arm 21. The robot 20 further includes a suction pad 93 attached to the end portion of the robot arm 21. The suction pad 93 holds the object 92. When the operator 91 applies a force to the handle 22, a force sensor 23 detects the force. The robot arm 21 is moved in accordance with the detected force, so that the robot arm 21 can function as a power-assist arm for assisting the operator 91 in performing an operation, such as moving an object. The robot arm 21 can move the object 92 by holding the object 92 with the suction pad 93. In the present specification, the term "end portion" of the robot arm 21 refers to the end of the robot arm 21 and the suction pad 93.

Figure 2:
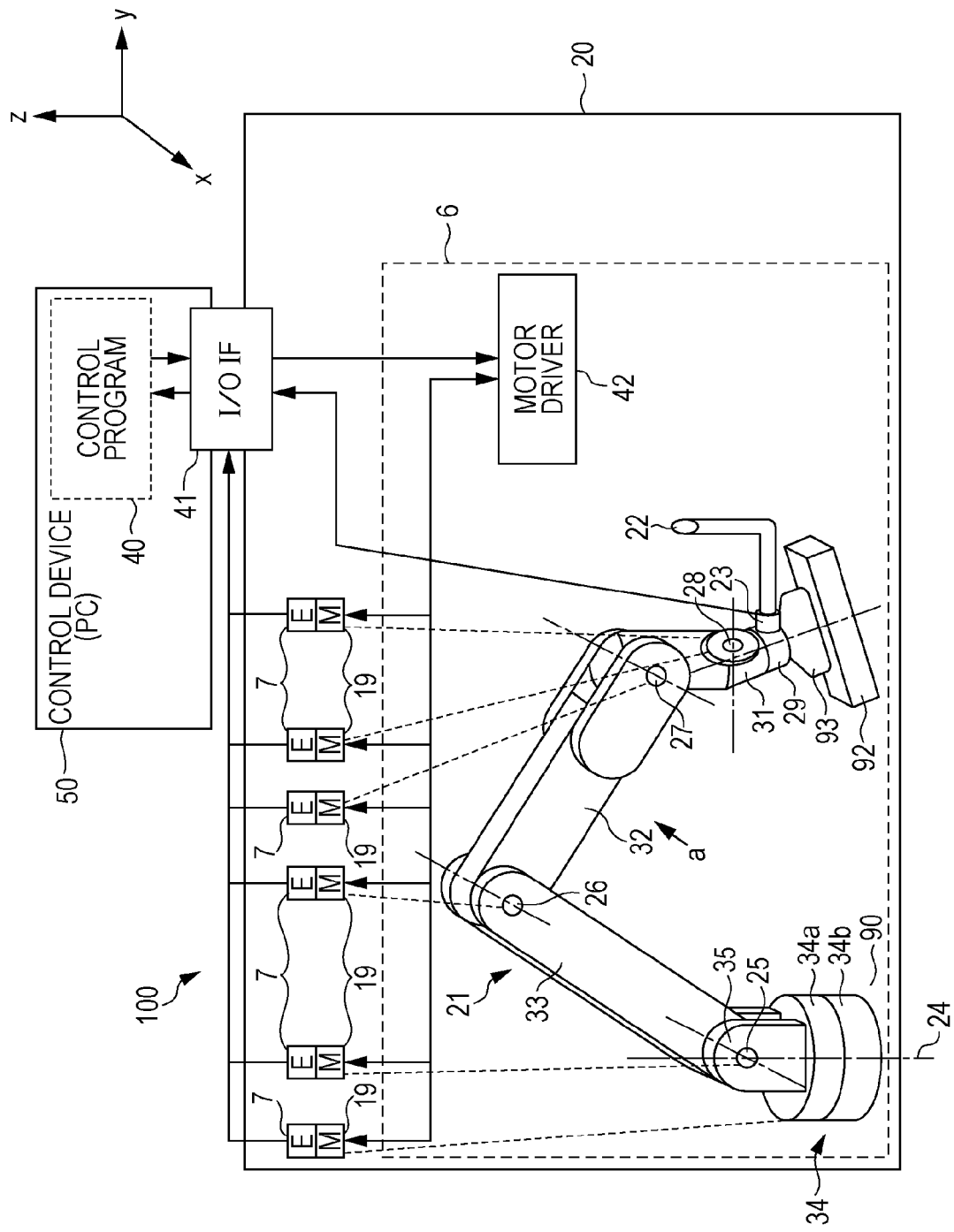
FIG. 2 illustrates the structure of a robot system according to the first embodiment of the present disclosure.

FIG. 2 illustrates the structure of the robot system 100 according to the first embodiment of the present disclosure.

The robot system 100 includes a control device 50 and the robot 20, which is a controlled by the control device 50.

In the first embodiment, the control device 50 is implemented, for example, in a general-purpose personal computer. The control device 50 includes a control program 40 and an I/O interface 41.

The I/O interface 41 includes, for example, a D/A board, an A/D board, and a counter board, each of which is connected to an expansion slot, such as a PCI bus, of the personal computer.

The control device 50 is connected to a motor driver 42 via the I/O interface 41, which is an example of an input unit. The control device 50 sends a control signal to the motor driver 42, and the motor driver 42 drives link manipulators of a robot mechanism 6.

The robot 20 includes the robot arm 21 as described above. The structure of the robot arm 21 will be described below.

The control device 50 controls movement of the robot arm 21 as follows. An encoder 7 (described below) disposed in each joint of the robot arm 21 outputs joint angle information about the joint (a rotation phase angle and the like). The control device 50 receives the joint angle information about each joint through the counter board of the I/O interface 41. The control device 50 calculates a control command value for controlling rotation of the joint on the basis of the received joint angle information. The control device 50 sends the calculated control command value through the D/A board of the I/O interface 41 to the motor driver 42 for driving each joint of the robot arm 21. Motors 19, which are examples of a driving device for driving the joint of the robot arm 21, are independently driven in accordance with the control command value sent from the motor driver 42. The motor driver 42 and the motors 19 function as an example of a drive unit. The encoders 7 function as an example of an angle detection unit that outputs angle information (rotation phase angles and the like). In other words, each of the encoders 7 function as a position information obtaining unit that obtains position information about an end portion of the robot arm 21. The motor driver 42 includes a current detector 8 for detecting an electric current flowing through the motor 19. As described below, the current detector 8 also functions as a second force detector for detecting a second force (an external force that the robot arm 21 receives from the outside) in corporation with a load torque estimation unit 13. The first force detector and the second force detector each function as an example of a force detector.

The robot arm 21, including a base 34, is, for example, a multi-link manipulator having six degrees of freedom. The handle 22 and the suction pad 93 can be attached to a wrist 31 at the end of the robot arm 21 via the force sensor 23. The robot arm 21 includes the wrist 31, a second link 32, a first link 33, a second joint supporting column 35, and the base 34. The wrist 31 is attached to an end of the second link 32. A base end of the second link 32 is rotatably connected to an end of the first link 33. A base end of the first link 33 is rotatably connected to and supported by the second joint supporting column 35. The second joint supporting column 35 is attached to the base 34, which is fixed to a floor 90. To measure a force that the operator 91 applies to the handle 22 with his/her hand, the force sensor 23, which is an example of a first force detector, is interposed between the handle 22 and the wrist 31. The suction pad 93, which is used to hold the object 92, is also attached to the end of the wrist 31.

The wrist 31 has three rotation axes, which correspond to the axes of a fourth joint 27, a fifth joint 28, and a sixth joint 29. The wrist 31 allows the position (orientation) of the handle 22 to be changed relative to the second link 32. The base end of the second link 32 is rotatable around a third joint 26 with respect to the end of the first link 33. The base end of the first link 33 is rotatable around a second joint 25 with respect to the second joint supporting column 35. An upper movable portion 34a of the base 34 is rotatable around a first joint 24 with respect to a lower fixing portion 34b of the base 34.

As a result, the robot arm 21 is structured as a multi-link manipulator having six degrees of freedom, which is rotatable independently around six rotation axes of the first joint 24 to the sixth joint 29.

Each of the joints, corresponding to rotary parts of the rotation axes, includes the motor 19 and the encoder 7, which are provided in one of a pair of members of the joint (for example, a rotary member and a support member that supports the rotary member). The motor 19 is an example of a rotary driving device that is controlled by the motor driver 42 (described below). The encoder 7 detects a rotation angle of the rotation shaft of the motor 19 (that is, a joint angle). (Actually, the motor 19 and the encoder 7 are disposed in each of the joints of the robot arm 21.) Thus, the rotation shaft of the motor 19, which is provided in one of the members of each joint, is connected to the other member of the joint. By rotating the rotation shaft in the forward or backward direction, the other member can be rotated around the rotation axis with respect to the one of the members.

Figure 3:
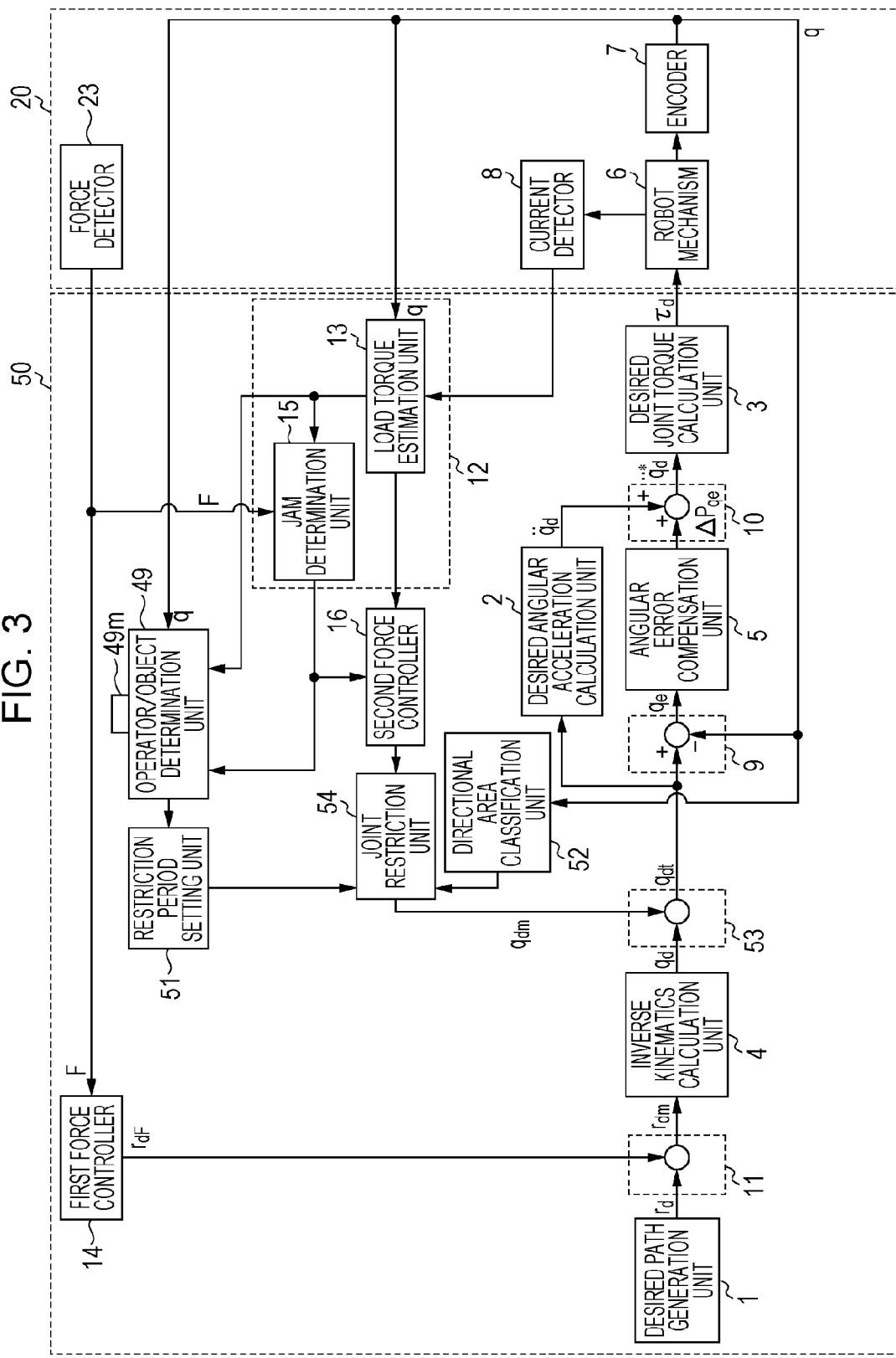
FIG. 3 is a block diagram of a device for controlling a robot and a part of the robot, which is a controlled system, according to the first embodiment of the present disclosure.

FIG. 3 is a block diagram of the control device 50 for the robot 20 and a part of the robot 20, which is a controlled system, according to the first embodiment of the present disclosure.

The control device 50 for the robot 20 includes a desired path generation unit 1, a desired angular acceleration calculation unit 2, a desired joint torque calculation unit 3, an inverse kinematics calculation unit 4, an angular error compensation unit 5, an angular error calculation unit 9, a corrected desired angular acceleration calculation unit 10, a desired path addition unit 11, a jam detection unit 12, a first force controller 14, a second force controller 16, an operator/object determination unit 49, a restriction period setting unit 51, a directional area classification unit (first area classification unit) 52, a desired value addition unit 53, and a joint restriction unit 54. The directional area classification unit 52 is an example of an area classification unit. The first force controller 14 and the second force controller 16 each function as an example of a force controller.

The jam detection unit 12 includes the load torque estimation unit 13 and a jam determination unit 15.

The robot 20 includes the robot mechanism 6, the encoder 7, the current detector 8, and the force sensor 23. The robot mechanism 6 includes the robot arm 21. The force sensor 23 is an example of a first force detector. Joint angle information measured by the encoder 7 is input from the robot 20 to the control device 50. A first force (a force vector F) measured by the force sensor 23 is input to the control device 50. The first force is a force that the operator 91 applies to the robot arm 21 via the handle 22.

The desired path generation unit 1 outputs a desired position vector $r_d$ to the desired path addition unit 11. The desired position vector $r_d$ is used to make the robot 20 move along a desired path to perform an operation. The path along which the robot 20 is moved is stored beforehand in a storage unit of the desired path generation unit 1 as desired positions $r_{dt} = [r_{dt1}, r_{dt2}, r_{dt3}, r_{dt4}, r_{dt5}, r_{dt6}]^T$ ($r_{d0}, r_{d1}, r_{d2}, \ldots$) for the time t (t=0, t=$t_1$, t=$t_2$, . . . ). The desired path generation unit 1 generates a desired position vector $r_d = [r_{d1}, r_{d2}, r_{d3}, r_{d4}, r_{d5}, r_{d6}]^T$ by performing polynomial interpolation on a path between points ($r_{d0}, r_{d1}, r_{d2}, \ldots$) for the time (t=0, t=$t_1$, t=$t_2$, . . . ).

The first force controller 14 calculates a corrected desired position vector $r_{dF}$ on the basis of the first force (the force vector F), which is output from the force sensor 23 of the robot 20, and outputs the corrected desired position vector $r_{dF}$ to the desired path addition unit 11. The first force controller 14 calculates a desired position vector $r_{dF}$ by using a force control method, such as an impedance control method or a compliance control method. The force sensor 23, which is an example of a first force detector, detects a force that the operator 91 applies to the handle 22 of the robot arm 21. The first force controller 14 calculates the corrected desired position vector $r_{dF}$ on the basis of the detected force and outputs the corrected desired position vector $r_{dF}$. By using the method described above, it is possible to realize an operator-robot cooperative operation in which the robot arm 21 moves in a direction of a force that the operator 91 applies to the robot arm 21.

The desired path addition unit 11 calculates a corrected desired position vector $r_{dm}$ by adding a desired position vector $r_d$, which is output from the desired path generation unit 1, and a corrected desired position vector $r_{dF}$, which is output from the first force controller 14. The desired path addition unit 11 outputs the corrected desired position vector $r_{dm}$ to the inverse kinematics calculation unit 4.

The inverse kinematics calculation unit 4 calculates a desired angle vector $q_d$ from the corrected desired position vector $r_{dm}$, which is input from the desired path addition unit 11. The inverse kinematics calculation unit 4 outputs the desired angle vector $q_d$ to the desired value addition unit 53. The desired angle vector $q_d$ is calculated from geometric information about the robot 20.

The load torque estimation unit 13 estimates a torque (estimated joint torque) generated by each motor 19 from an electric current passing through the motor 19, which is output from the current detector 8, and joint angle information of the joint, which is output from the encoder 7. From the estimated torque, the load torque estimation unit 13 estimates (detects) a force that the robot arm 21 receives from the outside. The estimated force is output, as a second force, to the jam determination unit 15, the second force controller 16, the operator/object determination unit 49, and the second force controller 16.

A torque $T_m$ generated by each motor 19 can be generally calculated as follows:

$$\tau_{mN} = Kt_N \cdot i_N$$

where $\tau_{mN}$ denotes a torque generated by the motor 19 for the rotation axis of the N-th joint, $i_N$ is the current value detected by the current detector 8, and $Kt_N$ is a torque coefficient of each rotation axis (where N is the joint number).

Next, the load torque estimation unit 13 estimates a torque $\tau_h$ that the robot arm 21 receives from the outside by subtracting a gravitational force acting on the robot arm 21 from the torque $\tau_m$ generated by the motor 19 of each rotation axis by using following expression:

$$\tau_h = \tau_m - g(q)$$

where $\tau_m$ is a torque generated by the motor 19 for each rotation axis, q is the angle information for each rotation axis input from the encoder 7, and g(q) is a gravity term acting on the robot arm 21.

The second force that is output is expressed by using torques applied to the joints from the outside as follows:

$$\tau_h = [\tau_{h1}, \tau_{h2}, \tau_{h3}, \tau_{h4}, \tau_{h5}, \tau_{h6}]^T$$

where n of $\tau_{hn}$ is the joint number.

While the robot arm 21 moves, each motor 19 outputs a torque expressed by the following expression:

$$\tau = M(q) \cdot \ddot{q}^* + C(q, \dot{q}) + g(q)$$

where M(q) and C(q,q̇) are respectively coefficient matrices consisting of dynamics parameters of the object 92 and the robot 20, and $\ddot{q}^*$ is the angular acceleration.

The load torque estimation unit 13 estimates a torque applied to each joint when a jam occurs. Therefore, at this time, it is considered that the robot arm 21 is substantially at rest. A torque $\tau$ generated by each motor 19 when the robot arm 21 is at rest, including only the gravity term, can be expressed as follows.

$$\tau = g(q)$$

By subtracting the gravity term from the torque $\tau_m$ generated by the motor 19 for each rotation axis, the load torque estimation unit 13 can calculate the difference between a torque that is output by the motor 19 and a torque needed to keep the robot arm 21 at rest. Therefore, the load torque estimation unit 13 can estimate that this difference is a torque applied to the robot arm 21 from the outside.

The jam determination unit 15 determines whether or not the operator 91 or an object is jammed between the robot arm 21 and an external structure from the first force F input from the force sensor 23 and the second force input from the load torque estimation unit 13. If the jam determination unit 15 determines that a jam has occurred, the jam determination unit 15 outputs a jam signal and a joint number of a joint at which the jam has occurred to the second force controller 16 and to the operator/object determination unit 49.

The term "jam" refers to a state in which at least a part of the body of the operator 91 or an object is jammed between the robot arm 21 and an external structure and it is difficult for the operator 91 to clear the jam. To be specific, even if a jam has actually occurs, the jam determination unit 15 does not determine that a jam has occurred if the operator 91 is applying a force to the handle 22. This is because, when the operator 91 is applying a force to the handle 22, it is likely that the operator 91 is intentionally inserting a part of his/her body between the robot arm 21 and the external structure in order to perform an operation, or, even when the operator 91 has been accidentally jammed, the operator 91 may be applying a force appropriately to get out of a jammed state.

If the magnitude of the force vector F input from the force sensor 23 is greater than or equal to a predetermined threshold, the jam determination unit 15 determines that the operator 91 is applying a force to the handle 22 and a jam has not occurred. If the magnitude of the force vector F input from the force sensor 23 is smaller than a first jam-determination threshold (which is, for example, zero) and all of the components of the second force output from the load torque estimation unit 13 are smaller than the predetermined second jam-determination threshold, the jam determination unit 15 determines that a force is not applied to the robot arm 21 from the outside and a jam has not occurred. If the magnitude of the force vector F input from the force sensor 23 is smaller than the first jam-determination threshold and any one of the components of the second force output from the load torque estimation unit 13 is greater than or equal to the predetermined second jam-determination threshold, the jam determination unit 15 determines that a jam has occurred. If the jam determination unit 15 determines that a jam has occurred, the jam determination unit 15 also outputs the joint number of a joint at which the jam has occurred to the second force controller 16 and to the operator/object determination unit 49. Thus, the jam determination unit 15 determines that a jam has occurred if an input from the force sensor 23 is zero (or smaller than a certain value) and an input from the load torque estimation unit 13, which is a part of the second force detector, is greater than or equal to a certain value. Moreover, the jam determination unit 15 determines that the jam has occurred at one of joints at which a torque that is greater than or equal to a predetermined threshold is generated and that has the largest joint number. The reason for this is as follows. Referring to FIG. 2, for example, if a jam occurs at the third joint 26, that is, if a force is applied to the second link 32 in the direction of arrow a, a load torque is generated at three joints, including the third joint 26, the second joint 25, and the first joint 24, due to the force applied to the robot arm 21 from the outside. However, a load torque is not generated at the fourth joint 27, the fifth joint 28, and the sixth joint 29, which are nearer to the end portion of the robot arm 21 than the second link 32 is. Thus, the jam determination unit 15 determines that a jam has occurred at one of the joints at which a load torque greater than or equal to a threshold is generated and that is nearest to the end portion of the robot arm 21.

The operator/object determination unit 49 determines whether a body that has been jammed is an operator or an object on the basis of the angle information input from the encoder 7, the second force input from the load torque estimation unit 13, and the jam signal input from the jam determination unit 15. The operator/object determination unit 49 outputs the determination result to the restriction period setting unit 51.

The operator/object determination unit 49 constantly stores the angle information and the second force for a period (such as one second) determined beforehand by experiment or the like in a storage device 49m of the operator/object determination unit 49. As a result, the storage device 49m constantly stores the angle information and the second force from one second before to the present time (when the control is performed). If a jam signal is input from the jam determination unit 15, the operator/object determination unit 49 determines whether a body that has been jammed is an operator or an object on the basis of information for the one second and information for a predetermined period from the time at which the jam signal is input. The predetermined period from the time at which the jam signal is input is also determined beforehand by experiment or the like. Here, it is assumed, for example, that the predetermined period is 0.5 seconds.

Figure 4A:
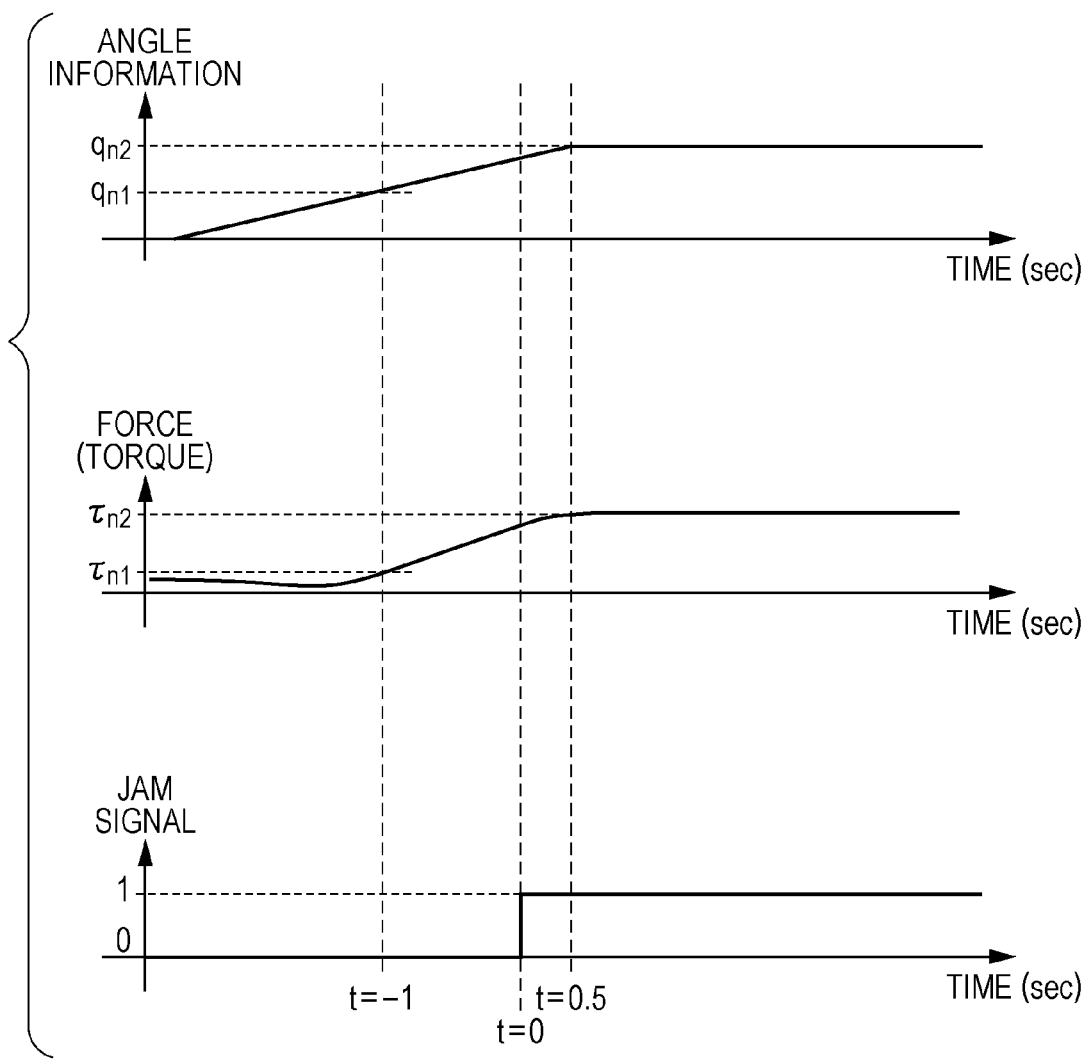
FIG. 4A is a graph illustrating an example of an algorithm of an operator/object determination unit according to the first embodiment of the present disclosure.
Figure 4B:
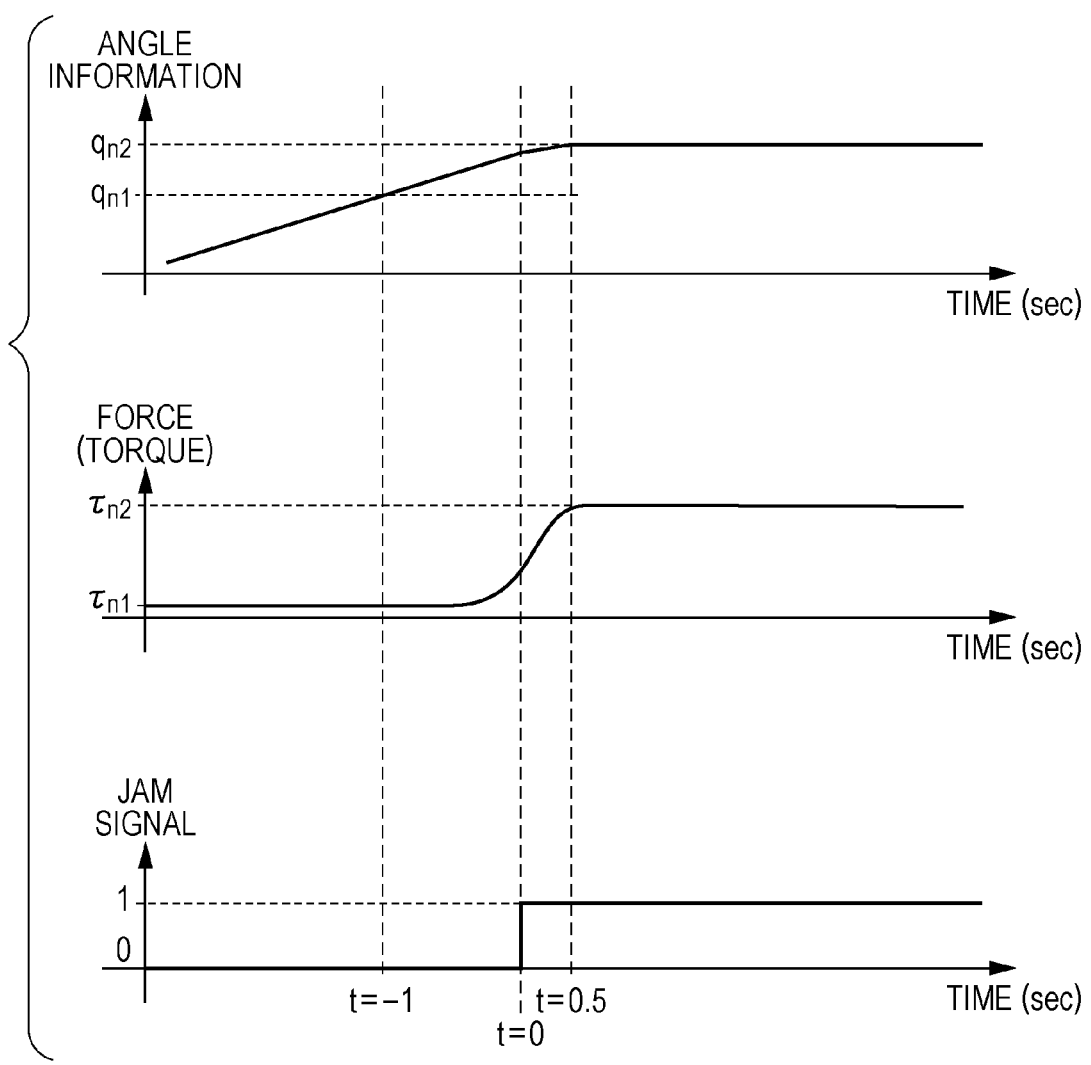
FIG. 4B is a graph illustrating an example of an algorithm of the operator/object determination unit according to the first embodiment of the present disclosure.

Referring to FIGS. 4A and 4B, this will be specifically described. A graph in the upper part of FIG. 4A represents the relationship between the time and the angle information, a graph in the middle part of FIG. 4A represents the relationship between the time and the second force, and a graph in the lower part of FIG. 4A represents the relationship between the time and the jam signal. Likewise, a graph in the upper part of FIG. 4B represents the relationship between the time and the angle information, a graph in the middle part of FIG. 4B represents the relationship between the time and the second force, and a graph in the lower part of FIG. 4B represents the relationship between the time and the jam signal. FIG. 4A illustrates an example in which the operator/object determination unit 49 determines that an operator has been jammed. At time t=0, a jam signal (having a value "1" in the graph) is input. The angle information and the second force from t=−1 to t=0 are stored in the storage device 49m of the operator/object determination unit 49. The angle information and the second force from time t=0 to 0.5 are also used. The second force and the angle information shown in FIG. 4A are the torque and the angle of a joint at which the jam determination unit 15 has estimated that a jam has occurred. The operator/object determination unit 49 calculates the elastic modulus K of a body (an operator or an object) that is jammed by using the following expression:

$$K = \left| \frac{\tau_{n2} - \tau_{n1}}{q_{n2} - q_{n1}} \right|$$

where n is the joint number of a joint at which a jam has occurred, $\tau_{n2}$ is an estimated joint torque at time t=0.5, $\tau_{n1}$ is an estimated joint torque at time t=−1, $q_{n2}$ is a joint angle output from the encoder 7 at time t=0.5, and $q_{n1}$ is a joint angle output from the encoder 7 at time t=−1.

Figure 11:
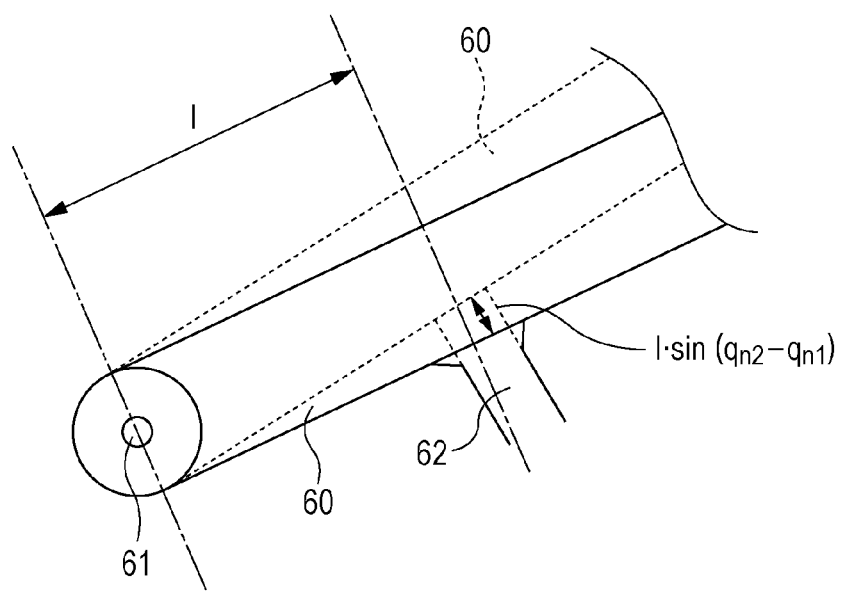
FIG. 11 is a diagram illustrating an expression used to calculate an elastic modulus in the first embodiment of the present disclosure.

Referring to FIG. 11, this expression, which is used to calculate the elastic modulus K, will be described. It is not possible to find from the estimated joint torque at which position of a link 60 a jam has occurred. Therefore, it is assumed here that a jam has occurred at a position on the link 60 that is at a length l from a joint axis (rotation axis) 61. A joint angle output from the encoder 7 immediately before a jam occurs corresponds to $q_{n1}$, and a joint angle output from the encoder 7 after a jam has occurred and when a force is applied to an object 62 corresponds to $q_{n2}$. An estimated joint torque immediately before a jam occurs corresponds to $\tau_{n1}$, and an estimate joint torque after a jam has occurred and when a force is applied to the object 62 corresponds to $\tau_{n2}$. Because it is considered that a change in the joint angle due to a jam is small, the position of a point of contact between the object 62 and the link 60 changes only negligibly before and after the occurrence of a jam. Assuming that the points of contact before and after the occurrence of a jam are both at the length l from the joint axis 61, a force applied from the link 60 to the object 62 due to the jam can be expressed as follows.

$$|l \cdot \tau_{n2} - l \cdot \tau_{n1}|)$$

An amount by which the object 62 is compressed due to the jam corresponds to a displacement of a portion of the link 60 at the length l. Therefore, the amount of compression can be expressed as follows.

$$|l \cdot \sin(q_{n2} - q_{n1})|$$

Because a change in the joint angle due to the jam is small, this can be approximated as follows.

$$|l \cdot \sin(q_{n2} - q_{n1})| \approx |l \cdot (q_{n2} - q_{n1})|$$

Thus, the elastic modulus K of the object 62 can be expressed as follows.

$$K = \left| \frac{l \cdot \tau_{n2} - l \cdot \tau_{n1}}{l \cdot \sin(q_{n2} - q_{n1})} \right| = \left| \frac{l \cdot (\tau_{n2} - \tau_{n1})}{l \cdot (q_{n2} - q_{n1})} \right| = \left| \frac{\tau_{n2} - \tau_{n1}}{q_{n2} - q_{n1}} \right|$$

If the elastic modulus K calculated by using the above expression is lower than a predetermined first operator-determination threshold, the operator/object determination unit 49 determines that an operator has been jammed. When the operator/object determination unit 49 determines that an operator has been jammed, the operator/object determination unit 49 outputs an operator signal to the restriction period setting unit 51.

FIG. 4B illustrates an example in which the operator/object determination unit 49 determines that an object has been jammed. At time t=0, a jam signal (having a value "1" in the graph) is input. The angle information and the second force from t=−1 to t=0 are stored in the storage device 49m of the operator/object determination unit 49. The angle information and the second force from time t=0 to 0.5 are also used. As in the case shown in FIG. 4A, the operator/object determination unit 49 calculates the elastic modulus K. Because the calculated elastic modulus K is higher than the threshold and higher than that of an operator, the operator/object determination unit 49 determines that an object has been jammed. When the operator/object determination unit 49 determines that an object has been jammed, the operator/object determination unit 49 outputs an object signal to the restriction period setting unit 51. Irrespective of whether the operator/object determination unit 49 determines that an operator has been jammed or an object has been jammed, the operator/object determination unit 49 outputs to the restriction period setting unit 51 a torque in a state in which a jam has occurred and a force is applied to an operator or an object, that is, the estimate joint torque $\tau_{n2}$ in the case where a force is applied as illustrated in FIG. 11.

The restriction period setting unit 51 outputs a predetermined restriction period to the joint restriction unit 54 on the basis of whether an operator signal or an object signal has been output from the operator/object determination unit 49 and a force generated due to the jam.

FIG. 13 is a table showing an example of an algorithm of the restriction period setting unit 51. The restriction period setting unit 51 stores a restriction period for each of cases where a body that is jammed is an object or an operator or where a force generated due to a jam is greater than a predetermined threshold or smaller than or equal to the predetermined threshold. The restriction period is a period during which the joint restriction unit 54 imposes a restriction (on movement) on a joint in force control performed after a jam has occurred. Thus, if the operator/object determination unit 49 determines that an operator has been jammed, the restriction period setting unit 51 sets a short restriction period in consideration of safety of the operator. In contrast, if the operator/object determination unit 49 determines that an object has been jammed, the restriction period setting unit 51 sets a restriction period longer than that of the case where the operator has been jammed in consideration of the effect on the external structure. If a force generated due to a jam is large, the operator/object determination unit 49 considers that the effect on the robot 20 and an effect an operator or an object that has been jammed would be large, and the operator/object determination unit 49 sets a restriction period shorter than that of a case where the force is small.

The second force controller 16 calculates a desired angle vector on the basis of a torque applied to each joint, which is an output from the load torque estimation unit 13, and outputs the desired angle vector to the joint restriction unit 54. The second force controller 16 calculates the desired angle vector by using a force control method, such as an impedance control method or a compliance control method. The load torque estimation unit 13 estimates a force applied to the robot arm 21 from the outside due to a jam or the like in addition to a force that the operator 91 applies to the handle 22 attached to the robot arm 21 as a torque (estimated joint torque) acting on each joint. The second force controller 16 calculates the desired angle vector on the basis of the estimated force and outputs the desired angle vector to the joint restriction unit 54. By using such a method, force control is realized in which the robot arm 21 is moved in a direction of a load torque applied to the robot arm 21 and the robot arm 21 is moved in a direction in which a force is applied from the outside when a jam occurs. When the force control is performed, the robot arm 21 is moved in a direction in which a force is applied from the outside and, if a jam occurs, the robot arm 21 is moved in such a direction that the jam is cleared due to a force that the robot arm 21 receives from an operator or an object that has been jammed. Therefore, the operator or the object that has been jammed can get out of a jammed state.

Figure 5:
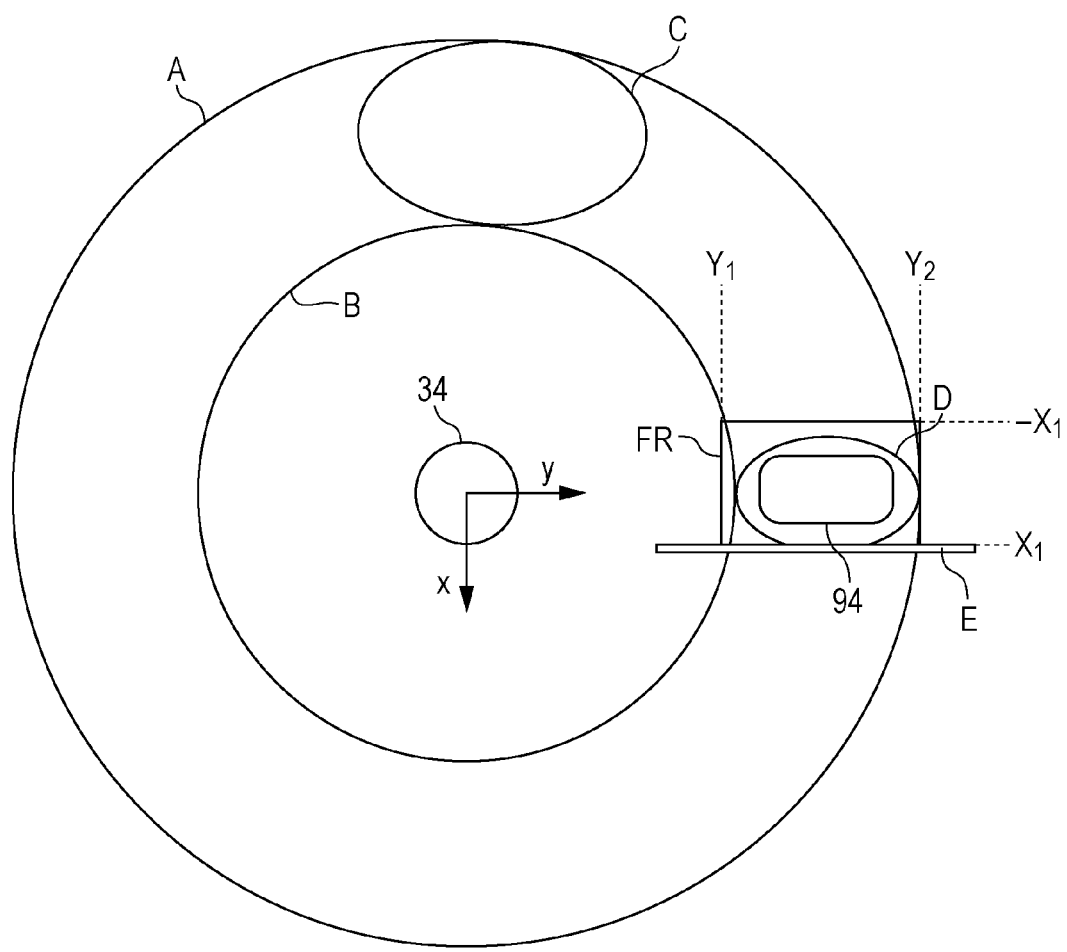
FIG. 5 is a sectional view of a path of an end portion of a robot arm, which is used to describe an example of operation performed by a directional area classification unit according to the first embodiment of the present disclosure.

A storage unit of the directional area classification unit 52 stores a map of an operation area of the robot arm 21. Directions in which movement is to be restricted are stored in the map beforehand. The directional area classification unit 52 outputs a direction in which movement from the present position (the position of the robot arm 21 when control is performed) is to be restricted to the joint restriction unit 54 on the basis of the angle information input from the encoder 7. FIG. 5 illustrates an example of an operation area classified by the directional area classification unit 52. In this example, it is assumed that movement in the z-axis direction (a direction perpendicular to the plane of FIG. 5) is small, and movement of the robot arm 21 along the xy-plane at a predetermined z coordinate will be described. In FIG. 5, an annular area between an outer circle A and an inner circle B is an area in which the suction pad 93 of the robot arm 21 is movable. It is assumed that the robot arm 21 performs an exemplary operation in which the robot arm 21 picks up the object 92 in an elliptical area C and moves the object 92 to a workbench 94 in an elliptical area D. It is assumed that a wall E, which is an example of an external structure, is present behind the area D (that is, below the area D in FIG. 5). In this case, it may happen that a part of an object or an operator becomes jammed between the workbench 94 in the area D and the object 92. However, even in such a case, it is desirable that a collision between the wall E and the object 92 be avoided to reduce the effect on the wall E, which is an external structure. (Avoiding a collision between the object 92 and the wall E corresponds to minimizing the effect on the external structure.) In order to prevent the object 92 from colliding with the wall E in an area FR, which includes the area D, the directional area classification unit 52 prohibits movement of the first joint 24.

The area FR can be represented by the following expression:

$$-X_1 \leq x \leq X_1, Y_1 \leq y \leq Y_2$$

where $X_1$ is an x-coordinate along a surface of the wall E.

In FIG. 5, a part of the annular area between the outer circle A and the inner circle B that overlaps the area FR is a restricted area in which movement of the first joint 24 is prohibited (an area in which restriction of movement is imposed on the robot arm 21). A part of the annular area between the outer circle A and the inner circle B that does not overlap the area FR is an unrestricted area in which movement of the first joint 24 is not prohibited (an area in which movement of the robot arm is not restricted) irrespective of whether or not the present time is in a restriction period.

The directional area classification unit 52 determines whether or not the suction pad 93 (the end portion of the robot arm) is located in the area FR on the basis of the angular information input from the encoder 7. If it is determined that the suction pad 93 is located in the area FR, the directional area classification unit 52 outputs information shown in FIG. 6A to the joint restriction unit 54. If it is determined that the suction pad 93 is not located in the area FR, the directional area classification unit 52 outputs information shown in FIG. 6B to the joint restriction unit 54. In FIGS. 6A and 6B, "1" means that restriction (on movement) is imposed on a joint and "0" means that restriction (on movement) is not imposed on a joint.

The directional area classification unit 52 may store a plurality if maps of operation areas including restricted areas. In this case, the directional area classification unit 52 may output, to the joint restriction unit 54, information about directions in which restriction on movement is imposed on the joints, as shown in FIG. 6A or 6B, for each of the maps of operation areas including a plurality of restricted areas on the basis of the position of the suction pad 93 (the end portion of the robot arm). Restriction on movement need not be imposed on at least one joint that is near the end portion of the robot arm 21.

On the basis of information on restricted directions output from the directional area classification unit 52, the joint restriction unit 54 calculates a restricted desired angle vector $q_{dm}$ by updating components of the desired angle vector, which is output from the second force controller 16, related to unrestricted directions while leaving components of the desired angle vector related to restricted directions unchanged. The joint restriction unit 54 outputs the restricted desired angle vector $q_{dm}$ to the desired value addition unit 53. However, after the elapse of the restriction period output from the restriction period setting unit 51, the joint restriction unit 54 calculates the restricted desired angle vector $q_{dm}$ by updating all of the components of the desired angle vector and outputs the desired restricted desired angle vector $q_{dm}$ to the desired value addition unit 53.

Specific operations are realized as described below.

The storage unit of the joint restriction unit 54 constantly stores the restricted desired angle vector $q_{dm}$, which has been calculated in the preceding calculation period. If the present time is in a restriction period output from the restriction period setting unit 51, in the present calculation period, the joint restriction unit 54 does not update the components of the desired angle vector related to unrestricted directions and outputs the desired angle vector to the desired value addition unit 53. The joint restriction unit 54 replaces components of the desired angle vector related to restricted directions with corresponding components of a restricted desired angle vector that is stored, and the joint restriction unit 54 outputs the restricted desired angle vector to the desired value addition unit 53. Finally, the joint restriction unit 54 stores the restricted desired angle vector in the storage unit thereof. The robot arm 21 is moved on the basis of the restricted desired angle vector $q_{dm}$ output from the joint restriction unit 54 (to be precise, on the basis of information including the restricted desired angle vector $q_{dm}$, as described below). As a result, the robot arm 21 is moved in a direction of a load torque that is not restricted but is not moved in a direction of a load torque that is restricted. If the present time is not in a restriction period output from the restriction period setting unit 51, in the present calculation period, the joint restriction unit 54 outputs the desired angle vector as it is to the desired value addition unit 53 as the restricted desired angle vector $q_{dm}$ and stores the restricted desired angle vector $q_{dm}$ in the storage unit thereof. The robot arm 21 is moved on the basis of the restricted desired angle vector $q_{dm}$ output from the joint restriction unit 54 (to be precise, on the basis of information including the restricted desired angle vector $q_{dm}$, as described below). As a result, the robot arm 21 is moved in any direction in which a load torque is directed.

The desired value addition unit 53 calculates a final angle desired value $q_{dt}$ by adding the restricted desired angle vector $q_{dm}$ output from the joint restriction unit 54 to the desired angle vector $q_d$ output from the inverse kinematics calculation unit 4. The desired value addition unit 53 outputs the final angle desired value $q_{dt}$ to the desired angular acceleration calculation unit 2 and to the angular error calculation unit 9.

The angular error calculation unit 9 calculates an angular error vector $q_e = q_{dt} - q$, which is an example of an output error, from the desired angle vector $q_{dt}$ output from the desired value addition unit 53 and an output q of the encoder 7. The angular error calculation unit 9 outputs the angular error vector $q_e$ to the angular error compensation unit 5.

The desired angular acceleration calculation unit 2 calculates a desired angular acceleration $\ddot{q}_d$ from the desired angle vector $q_{dt}$ output from the desired value addition unit 53. The desired angular acceleration calculation unit 2 outputs the desired angular acceleration $\ddot{q}_d$ to the corrected desired angular acceleration calculation unit 10.

The angular error compensation unit 5 calculates an angular error correction command value $\Delta P_{qe}$, which is an example of a control command value, from the angular error vector $q_e$ output from the angular error calculation unit 9. The angular error compensation unit 5 outputs the angular error correction command value $\Delta P_{qe}$ to the corrected desired angular acceleration calculation unit 10.

The corrected desired angular acceleration calculation unit 10 calculates a corrected desired angular acceleration $\ddot{q}_d^*$, which is an example of a control command value, from the desired angular acceleration $\ddot{q}_d$ output from the desired angular acceleration calculation unit 2 and the angular error correction command value $\Delta P_{qe}$ output from the angular error compensation unit 5. The corrected desired angular acceleration calculation unit 10 outputs the corrected desired angular acceleration $\ddot{q}_d^*$ to the desired joint torque calculation unit 3.

The desired joint torque calculation unit 3 calculates a desired joint torque $\tau_d$ from a corrected desired angular acceleration $\ddot{q}_d$ output from the corrected desired angular acceleration calculation unit 10 and a dynamics parameter stored in the storage unit of the desired joint torque calculation unit 3. The desired joint torque calculation unit 3 outputs the desired joint torque $\tau_d$ to the motor driver 42 of the robot mechanism 6. The desired joint torque $\tau_d$ can be calculated by using, for example, the following expression:

$$\tau_d = M(q) \cdot \ddot{q}_d^* + C(q, \dot{q}) + g(q)$$

where $M(q)$ and $C(q, \dot{q})$ are respectively coefficient matrices composed of dynamic parameters of the object 92 and the robot 20, and $g(q)$ is a gravity term acting on the mass of the object 92 and the robot 20.

The desired joint torque $\tau_d$ is input from the desired joint torque calculation unit 3 to the motor driver 42 via the I/O interface 41, such as a D/A board, as a desired torque value. The motor driver 42 causes the motors 19 of the joint axes to independently rotate in the forward or backward direction, and thereby the robot arm 21 of the robot mechanism 6 is operated.

When the robot arm 21 of the robot mechanism 6 moves, the joint angles of the robot arm 21 change. The encoder 7 detects the joint angles q and outputs the detected joint angles q to the angular error calculation unit 9 via the I/O interface 41.

As described above, the control device 50 according to the first embodiment includes the desired path generation unit 1, the desired angular acceleration calculation unit 2, the desired joint torque calculation unit 3, the inverse kinematics calculation unit 4, the angular error compensation unit 5, the angular error calculation unit 9, the corrected desired angular acceleration calculation unit 10, the desired path addition unit 11, the jam detection unit 12, the first force controller 14, the second force controller 16, the operator/object determination unit 49, the restriction period setting unit 51, the directional area classification unit 52, the desired value addition unit 53, and the joint restriction unit 54. The jam detection unit 12 includes the load torque estimation unit 13 and the jam determination unit 15. The robot 20 includes the robot mechanism 6 including the robot arm 21; the encoders 7; the force sensor 23, which is an example of a first force detector; the current detector 8; and the motors 19, whose torque is controlled. The jam detection unit 12 detects whether or not a jam has occurred and a force acting on the robot arm 21 from the outside when a jam occurs. The second force controller 16 performs force control for moving the robot arm 21 on the basis of the force acting on the robot arm 21. At this time, the directional area classification unit 52 restricts the direction in which the robot arm 21 is moved in accordance with the operation area in which the suction pad 93 is located. Moreover, after the elapse of a certain restriction period, the restriction period setting unit 51 allows the robot 20 to be moved in any direction. In other words, if the jam determination unit 15 determines that a jam has occurred, during a restriction period set by the restriction period setting unit 51 to impose a restriction on movement, control is performed as follows: if the directional area classification unit 52 determines that the end portion of the robot arm 21 is located in the restricted area determined by the directional area classification unit 52 on the basis of information about the position of the end portion of the robot arm 21 obtained by the encoders 7, movement of one or more of the joints to be restricted is stopped and the first force controller 14 controls movement of at least one of the joints that are not restricted. Thus, movement of at least one of the joints near to the end portion of the robot arm 21 is not restricted. After the elapse of the restriction period set by the restriction period setting unit 51, the restriction on the joints is removed. Moreover, if the directional area classification unit 52 determines that the end portion of the robot arm 21 is located in the unrestricted area determined by the directional area classification unit 52, the first force controller 14 controls movement of the joints without restricting movement of any of the joints. It is possible to set a short restriction period if the operator/object determination unit 49 determines that the operator 91 has been jammed, and it is possible to set a long restriction period if the operator/object determination unit 49 determines that an object has been jammed. As a result of performing control as described above, if a jam occurs, by performing force control so that the object 92 held by the suction pad 93 might not collide with an external structure or the like, it is possible to control the robot arm 21 to be moved in such a direction that allows an operator or an object that has been jammed to get out of a jammed state. If it is not possible for an operator or an object to get out of a jammed state by moving the robot arm 21 in an operation area in which the object 92 does not collide with an external structure or the like, force control is performed so as to allow all joints to be moved after the elapse of the restriction period. Therefore, the robot arm 21 moves in a direction in which the robot arm 21 receives a force from the operator or the object that has been jammed, and therefore the operator or the object can get out of a jammed state. In consideration of safety of an operator, if it is determined that an operator has been jammed, a short restriction period is set so that the operator can get out of a jammed state without fail in a time shorter than that of a case where an object is jammed. For example, the restriction period setting unit 51 may set a shorter restriction period when an external force (second force) detected by the second force detector is larger.

Second Embodiment

Figure 7:
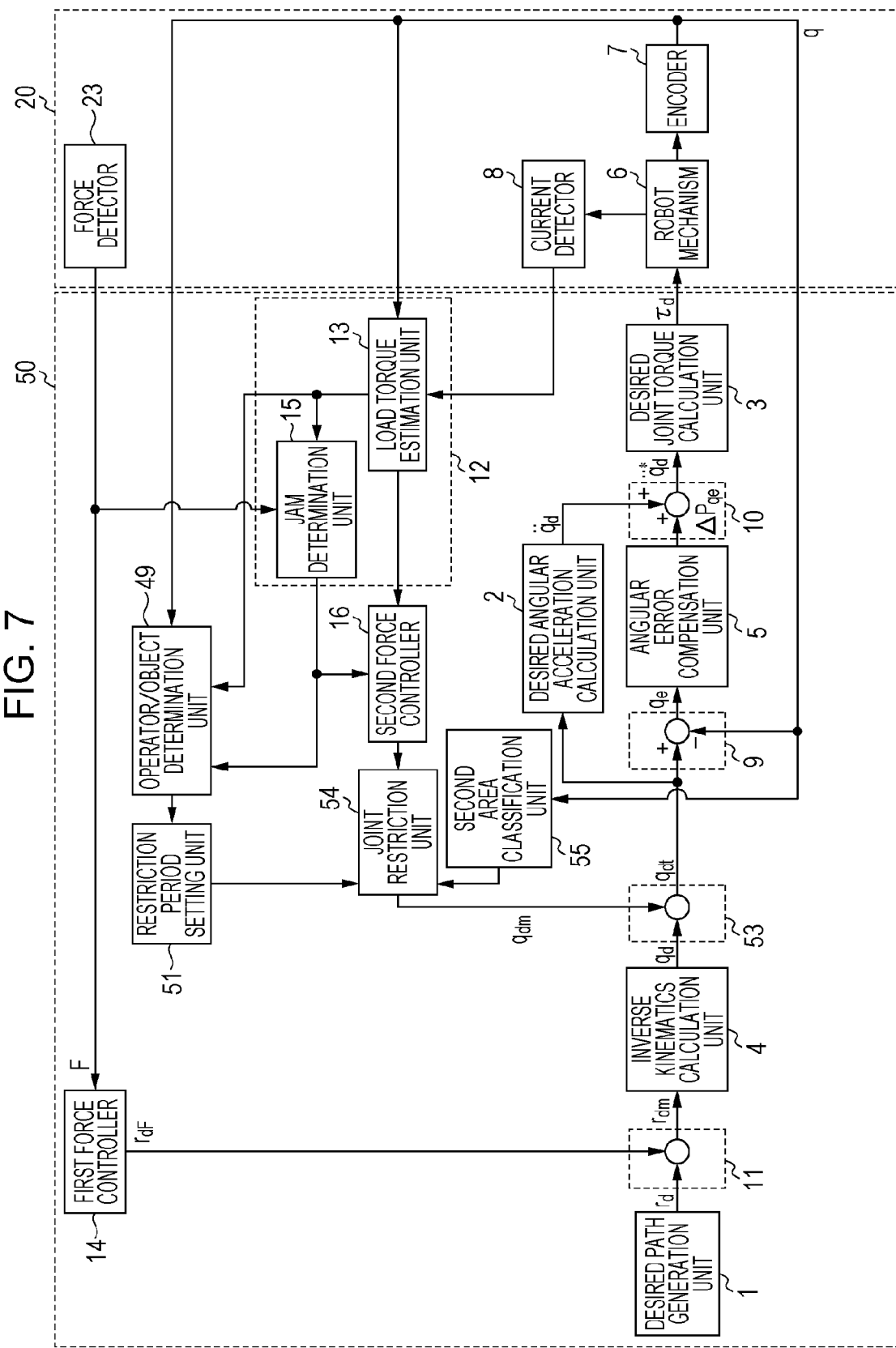
FIG. 7 is a block diagram of a device for controlling a robot and a part of the robot, which is a controlled system, according to a second embodiment of the present disclosure.

FIG. 7 is a block diagram of a control device 50 for a robot 20 and a part of the robot 20, which is a controlled system, according to a second embodiment of the present disclosure. In the first embodiment, information (restriction information) about an area in which movement of the robot arm 21 is restricted and an area in which movement of the robot arm 21 is not restricted is stored beforehand. In contrast, in the second embodiment, restriction information is not stored beforehand but is generated from information obtained while controlling the movement of the robot arm 21.

The control device 50 for the robot 20 includes a desired path generation unit 1, a desired angular acceleration calculation unit 2, a desired joint torque calculation unit 3, an inverse kinematics calculation unit 4, an angular error compensation unit 5, an angular error calculation unit 9, a corrected desired angular acceleration calculation unit 10, a desired path addition unit 11, a jam detection unit 12, a first force controller 14, a second force controller 16, an operator/object determination unit 49, a restriction period setting unit 51, a second area classification unit 55, a desired value addition unit 53, and a joint restriction unit 54. The second area classification unit 55 is another example of an area classification unit.

The jam detection unit 12 includes a load torque estimation unit 13 and a jam determination unit 15.

The robot 20 includes a robot mechanism 6, an encoder 7, a current detector 8, and a force sensor 23. The robot mechanism 6 includes a robot arm 21. The force sensor 23 is an example of a first force detector. Joint angle information measured by the encoder 7 is input from the robot 20 to the control device 50. A first force (a force vector F) obtained by the force sensor 23 is input to the control device 50. The first force is a force that an operator 91 applies to the robot arm 21 via a handle 22.

The operator/object determination unit 49 determines that the operator 91 is jammed if the difference between the maximum value and the minimum value of the second force in a period from a time that is a certain time (such as 0.5 seconds, which may be determined by experiment beforehand) after a jam signal was input to a time that is a further time (such as 1 second) after the jam signal was input is greater than or equal to a predetermined threshold. If the difference is smaller than the threshold, the operator/object determination unit 49 determines that an object has been jammed. This is because it is considered that, if an operator has been jammed, a joint of the robot arm 21 can move in a certain range and a force applied to the robot arm 21 changes, but, if an object has been jammed, a force applied to the robot arm 21 does not change.

Figure 10A:
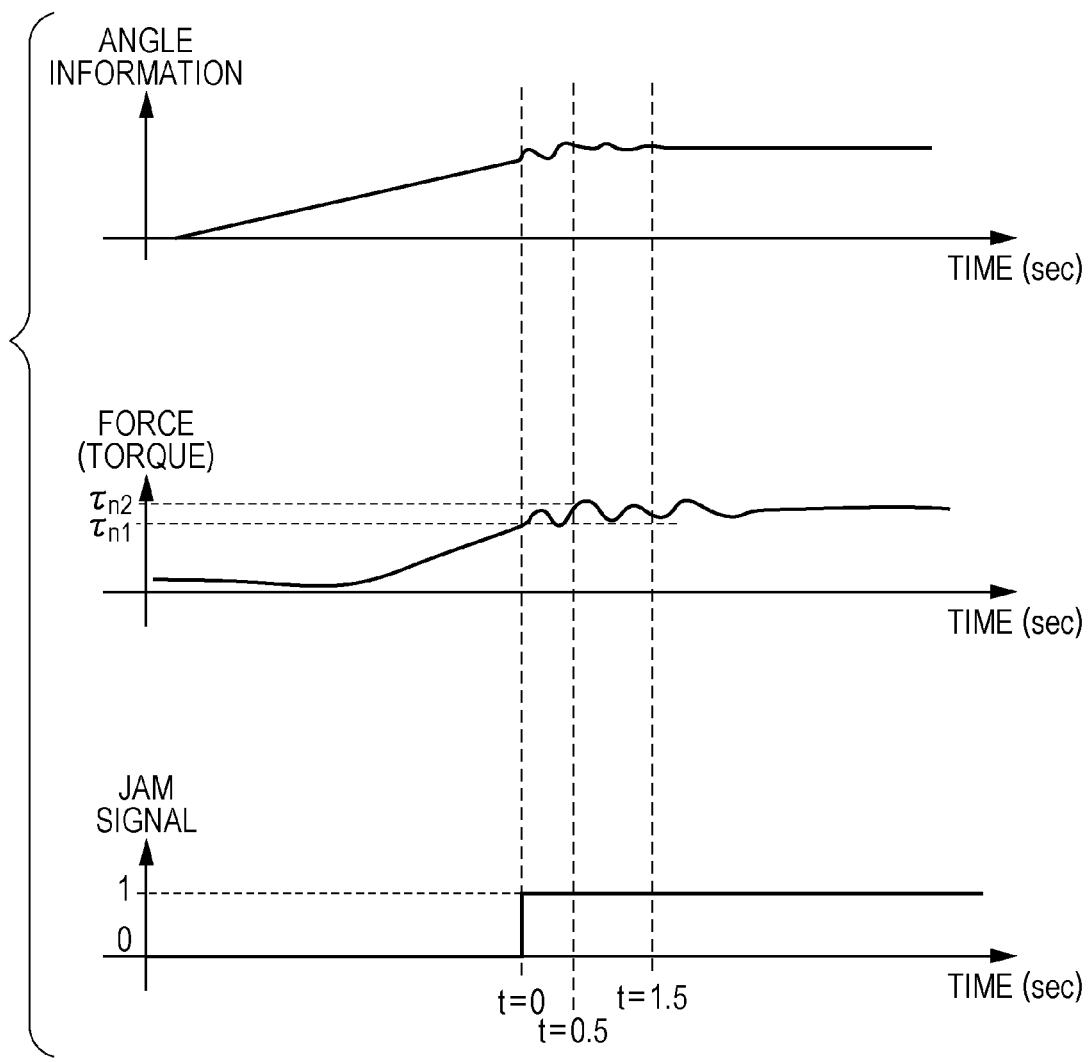
FIG. 10A is a graph illustrating an example of an algorithm of an operator/object determination unit according to the second embodiment of the present disclosure.
Figure 10B:
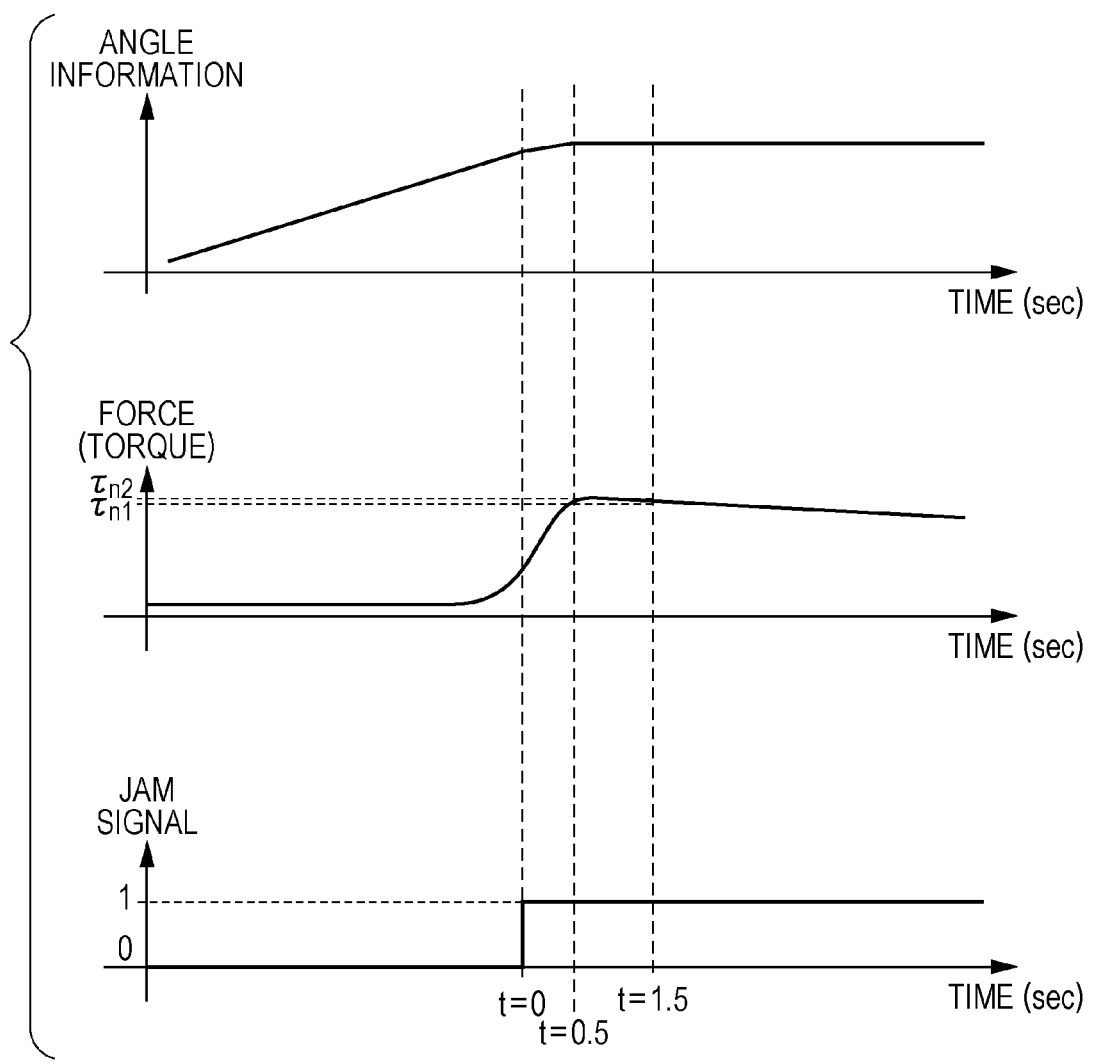
FIG. 10B is a graph illustrating an example of an algorithm of the operator/object determination unit according to the second embodiment of the present disclosure.

Referring to FIGS. 10A and 10B, this will be specifically described. FIG. 10A illustrates an example in which the operator/object determination unit 49 determines that an operator has been jammed. At time t=0, a jam signal is input. The operator/object determination unit 49 calculates the difference between the maximum value $\tau_{n2}$ and the minimum value $\tau_{n1}$ of the second force from time t=0.5 to t=1.5. Because the difference is greater than or equal to a predetermined second operator-determination threshold, the operator/object determination unit 49 determines that an operator has been jammed. When the operator/object determination unit 49 determines that an operator has been jammed, the operator/object determination unit 49 outputs an operator signal to the restriction period setting unit 51.

FIG. 10B illustrates an example in which the operator/object determination unit 49 determines that an object has been jammed. At time t=0, a jam signal is input. The operator/object determination unit 49 calculates the difference between the maximum value $\tau_{n2}$ and the minimum value $\tau_{n1}$ of the second force from time t=0.5 to t=1.5. Because the difference is smaller than the predetermined threshold, the operator/object determination unit 49 determines that an object has been jammed. When the operator/object determination unit 49 determines that an object has been jammed, the operator/object determination unit 49 outputs an object signal to the restriction period setting unit 51. In FIGS. 10A and 10B, as in FIGS. 4A and 4B, n is the joint number of a joint at which a jam has occurred, tint is an estimated joint torque at time t=0.5, $\tau_{n1}$ is an estimated joint torque at time t=−1, $q_{n2}$ is a joint angle output from the encoder 7 at time t=0.5, and $q_{n1}$ is a joint angle output from the encoder 7 at time t=−1.

The second area classification unit 55 calculates the end velocity of the of the robot arm 21 (the velocity of movement of the end portion of the robot arm 21) on the basis of angle information output from the encoder 7. In accordance with the calculated end velocity, the second area classification unit 55 classifies the current position of the end portion into a restricted area and an unrestricted area, and outputs the classification result to the joint restriction unit 54. To calculate the end velocity, the second area classification unit 55 calculates the position of the end portion (the suction pad 93) on the basis of angle information input from the encoder 7 and geometric information about the robot arm 21, and the second area classification unit 55 differentiate the change in the position with respect to time.

Figure 8:
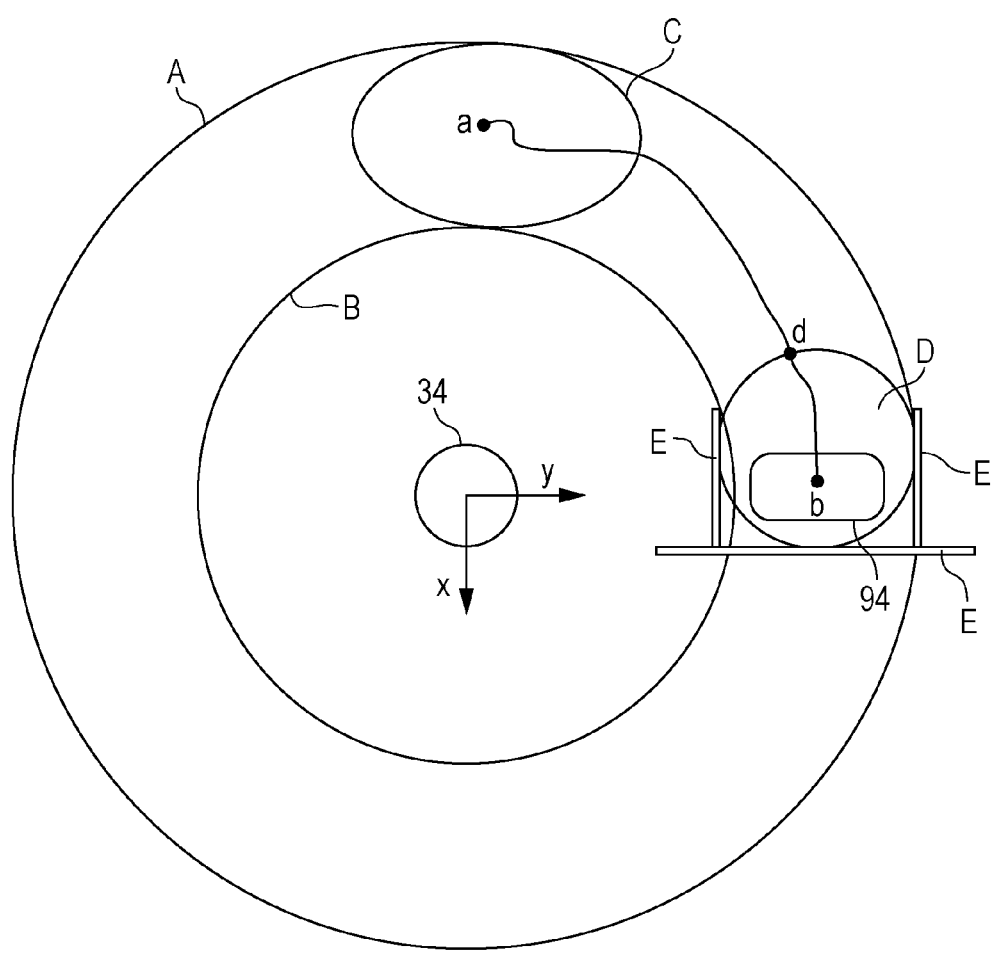
FIG. 8 is a sectional view of a path of an end portion of a robot arm, which is used to describe an example of operation performed by an area classification unit according to the second embodiment of the present disclosure.

Referring to FIG. 8, an operation performed by the second area classification unit 55 will be described. In the example illustrated in FIG. 8, it is assumed that movement in the z-axis direction is small, and movement of the robot arm 21 along the xy-plane at a predetermined z coordinate, around which the robot arm 21 moves, will be described. In FIG. 8, an annular area between an outer circle A and an inner circle B is an area in which the suction pad 93 attached to the end of the robot arm 21 is movable. It is assumed that the robot arm 21 performs an exemplary operation in which the robot arm 21 picks up the object 92 in an elliptical area C and moves the object 92 to a workbench 94 in an elliptical area D. It is assumed that walls E, which are examples of an external structure, are present on the left side, on the right side, and behind the area D (that is, on the left side, on the right side, and below the area D in FIG. 8). It is assumed that the position of the end portion of the robot arm 21 moves along a path from a point a to a point b in a certain operation. The path of the end portion is represented by a solid line. The operator 91 picks up the object 92 at the point a and starts moving the object 92. Because there are no obstacles near the path from the point a to the point d, the end of the robot arm 21 moves from the point a toward the point d with a comparatively high velocity. When approaching the point d, the velocity of the end of the robot arm 21 is reduced so that the object 92 can be moved toward the point b while avoiding a collision between the object 92 and the walls E. Then, the robot arm 21 reaches the point b. During this operation, the second area classification unit 55 calculates the position of the end portion of the robot arm 21 and the end velocity with which the end portion passes the position by using the angle information input from the encoder 7. If the calculated end velocity is higher than or equal to a predetermined velocity threshold, the second area classification unit 55 classifies restriction information about the position into "0" (unrestricted). If the calculated end velocity is lower than the velocity threshold, the second area classification unit 55 classifies restriction information about the position into "1" (restricted). FIG. 9 shows a specific example of classification performed by the second area classification unit 55. At time $t=t_n$, the end portion of the robot arm 21 passes the point d in FIG. 8, and the operator 91 reduces the velocity of the robot arm 21. As a result, no restriction is imposed until time $t=t_n$. The second area classification unit 55 outputs restriction information "0" to the joint restriction unit 54. After time $t_{n+1}$, the second area classification unit 55 outputs restriction information "1", because the velocity of the end portion of the robot arm 21 has become high.

A storage unit of the joint restriction unit 54 stores information about joints on which restriction of movement is to be imposed (joints to be stopped) and information about joints on which restriction of movement is not to be imposed (joints to be moved). If the present time is in a restriction period output from the restriction period setting unit 51, the joint restriction unit 54 calculates a restricted desired angle vector $q_{dm}$ by updating components of the desired angle vector, which is output from the second force controller 16, related to unrestricted directions while leaving components of the desired angle vector related to restricted directions unchanged. The joint restriction unit 54 outputs the restricted desired angle vector $q_{dm}$ to the desired value addition unit 53. However, after the elapse of the restriction period output from the restriction period setting unit 51, the joint restriction unit 54 calculates the restricted desired angle vector $q_{dm}$ by updating all of the components of the desired angle vector and outputs the desired restricted desired angle vector $q_{dm}$ to the desired value addition unit 53. If restriction information input from the second area classification unit 55 is "0" at the time at which the desired angle vector is started to be input from the second force controller 16, that is, at the time at which the jam determination unit 15 determines that a jam has occurred, irrespective of the restriction period output from the restriction period setting unit 51, the joint restriction unit 54 calculates a restricted desired angle vector $q_{dm}$ by updating all components of the desired angle vector and outputs the restricted desired angle vector $q_{dm}$ to the desired value addition unit 53. If the restriction information is "1", which means that the present position is in a restricted area, during the restriction period, the joint restriction unit 54 calculates the restricted desired angle vector $q_{dm}$ by updating components of the desired angle vector related to unrestricted joints while leaving components of the desired angle vector related to restricted joints unchanged and outputs the restricted desired angle vector $q_{dm}$ to the desired value addition unit 53.

Specific operation of imposing restriction is the same as that of the first embodiment.

The joint restriction unit 54 determines joints that are to be restricted and joints that are not to be restricted beforehand as follows. The joint restriction unit 54 sorts the joints in the descending order of the distance over which the end portion of the robot arm 21 is moved when the joint is operated. The joint restriction unit 54 determines a restricted joint group that includes some of the joints that move the end portion of the robot arm 21 over a comparatively large distance and an unrestricted joint group including the remaining joints. For example, in the robot arm 21 illustrated in FIG. 2, for the rotation of 10 degrees, the first joint 24 moves the end portion over the largest distance, and the second joint 25, the third joint 26, and the fourth joint 27 respectively moves the end portion over the second, third, and fourth largest distances, and so on. Therefore, the joint restriction unit 54 classifies the first joint 24, the second joint 25, and the third joint 26 as restricted joints, and classifies other joints as unrestricted joints, and store the classification in the storage unit thereof. In other words, restriction is not imposed on at least one of the joints near the end portion of the robot arm 21.

As described above, the control device 50 according to the second embodiment includes the desired path generation unit 1, the desired angular acceleration calculation unit 2, the desired joint torque calculation unit 3, the inverse kinematics calculation unit 4, the angular error compensation unit 5, the angular error calculation unit 9, the corrected desired angular acceleration calculation unit 10, the desired path addition unit 11, the jam detection unit 12, the first force controller 14, the second force controller 16, the operator/object determination unit 49, the restriction period setting unit 51, the second area classification unit 55, the desired value addition unit 53, and the joint restriction unit 54. The jam detection unit 12 includes the load torque estimation unit 13 and the jam determination unit 15. The robot 20 includes the robot mechanism 6 including the robot arm 21; the encoders 7; the force sensor 23, which is an example of a first force detector; the current detector 8; and the motors 19, whose torque is controlled. The jam detection unit 12 detects whether or not a jam has occurred and a force acting on the robot arm 21 from the outside when a jam occurs. The second force controller 16 performs force control for moving the robot arm 21 on the basis of the force acting on the robot arm 21. At this time, the second area classification unit 55 can determine whether the present area is a restricted area or an unrestricted area from an operation velocity (such as the velocity of the end portion of the robot arm 21) immediately before the present time even though restricted areas have not been determined beforehand. If the present area is a restricted area, the direction in which the robot arm is to be moved is restricted. Moreover, the restriction period setting unit 51 allows the robot arm 21 to be moved in any direction after the elapse of a certain restriction period. It is possible to set a short restriction period if the operator/object determination unit 49 determines that the operator 91 has been jammed, and it is possible to set a long restriction period if the operator/object determination unit 49 determines that an object has been jammed. As a result of performing control as described above, if a jam occurs, by performing force control so that the object 92 held by the suction pad 93 might not collide with an external structure or the like, it is possible to control the robot arm 21 to be moved in such a direction that allows the operator or an object that has been jammed to get out of a jammed state. If it is not possible for an operator or an object to get out of a jammed state by moving the robot arm 21 in an operation area in which the object 92 does not collide with an external structure or the like, force control is performed so as to allow all joints to be moved after the elapse of the restriction period. Therefore, the robot arm 21 moves in a direction in which the robot arm 21 receives a force from the operator or the object that has been jammed, and therefore the operator or the object can get out of a jammed state. In consideration of safety of an operator, if it is determined that an operator has been jammed, a short restriction period is set so that the operator can get out of a jammed state without fail in a time shorter than that of a case where an object is jammed. Even in a case where a map of an operation area is not stored beforehand, it is possible to realize the control because the second area classification unit 55 estimates the effect on an external structure from an immediately preceding operation state and determines whether the present area is a restricted area or an unrestricted area.

In the first and second embodiments, the robot arm 21 having six axes is used as an example. However, this is not a restriction.

In the first and second embodiments, the second force detector performs estimation on the basis of an electric current in the motor. However, this is not a restriction. For example, each joint axis may be provided with a torque sensor or any other estimation means.

The present disclosure can be applied to not only a robot that performs an operation of moving an object but also to a robot that performs an assembly operation or a processing operation by using a tool attached to an end of the arm.

The present disclosure is not restricted to the first and second embodiments described above. The present disclosure also includes the following cases.

A part or all of the control device 50 is, specifically, a computer system including a microprocessor, a ROM, a RAM, a hard disk unit, a display unit, a keyboard, and a mouse. A computer program is stored in the RAM or the hard disk unit. As the microprocessor executes the computer program, each unit performs its function. The computer program includes a plurality of instruction codes that cause the computer to perform a predetermined function.

For example, each element is realized when a processor, such as a CPU, reads a software program stored in a storage medium, such as hard disk or a semiconductor memory, and executes the software program.

A program that realizes some or all of the elements of the control device according to the embodiments or modifications is configured as follows. The program is a control program for a multi-link robot that causes the computer to function as a force controller, a first force detector, a jam determination unit, a joint restriction unit, an area classification unit, and a restriction period setting unit. The force controller controls movement of a robot arm having a plurality of joints on the basis of the position of an end portion of the robot arm obtained by a position information obtaining unit. The first force detector detects a force that an operator applies to the robot arm. The jam determination unit determines whether an operator or an object is jammed between the robot arm and the external structure on the basis of a force detected by the first force detector. The joint restriction unit determines a joint on which restriction of movement is not to be imposed and a joint on which restriction of movement is to be imposed. The area classification unit classifies areas in which the end portion of the robot arm moves into a restricted area in which movement of the robot arm is restricted and an unrestricted area in which movement of the robot arm is not restricted. The restriction period setting sets a restriction period during which unit the movement is restricted. Moreover, if the jam determination unit determines that a jam has occurred, during the restriction period set by the restriction period setting unit to impose a restriction on movement, the program causes the computer to perform control as follows: if the area classification unit determines that the end portion of the robot arm is located in the restricted area determined by the area classification unit on the basis of information about the position of the end portion of the robot arm obtained by the position information obtaining unit, movement of one or more of the joints to be restricted is stopped and the first force controller controls movement of at least one of the joints that are not restricted. After the elapse of a restriction period for which restriction on movement is imposed, which is set by the restriction period setting unit, the restriction on the joints is removed. Moreover, if it is determined that the end portion of the robot arm is located in the unrestricted area that is determined by the directional area classification unit, the first force controller controls movement of the joints without restricting movement of any of the joints.

The program may be downloaded from a server or the like. Alternatively, the program may be stored in a predetermined recording medium (which is, for example, an optical disc such as CD-ROM, a magnetic disc, or a semiconductor memory).

The program may be executed by a single computer or a plurality of computers. In other words, the program may be executed in centralized processing or distributed processing.

The effects of the embodiments or modifications can be obtained by using appropriate combinations of the embodiment and modifications.

The robot, the device and the method for controlling a robot, and the program for controlling a robot according to the present disclosure are useful as a power-assist robot that performs an operation in cooperation with an operator, a device and a method for controlling a robot, and a program for controlling a robot.

CROSS REFERENCE TO RELATED APPLICATION

The present application claims the benefit of Japanese Patent Application No. 2014-011945 filed on Jan. 27, 2014. The entire disclosure of the above-identified application, including the specification, drawings and claims, is incorporated herein by reference in its entirety.

What is claimed is:

1. A robot comprising:
a position information obtaining unit that obtains position information about an end portion of a robot arm having a plurality of joints;
a first force detector that detects a force that an operator applies to the robot arm;
a jam determination unit that determines whether or not the operator or an object is jammed between the robot arm and an external structure on the basis of the force detected by the first force detector;
an area classification unit that classifies an area in which the end portion moves into a restricted area and an unrestricted area;
a restriction period setting unit that sets a restriction period during which movement of the robot arm is restricted;

a microprocessor that:
imposes movement restriction on, and automatically stops movement of, one or more of the plurality of joints if an elapsed period after detection of the jam is in the restriction period and the end portion is located in the restricted area, and does not restrict movement of at least one of the plurality of joints excluding the one or more of the plurality of joints,
removes the movement restriction if the elapsed period ends after the restriction period, and
does not impose movement restriction on the plurality of joints if the elapsed period after detection of the jam is in the restriction period and the end portion is located in the unrestricted area.

2. The robot according to claim 1, further comprising:
a second force detector that detects an external force that the robot arm receives from the outside,
wherein the jam determination unit determines that the operator or the object is jammed between the robot arm and the external structure on the basis of the force detected by the first force detector and the external force that the robot arm receives from the outside and that is detected by the second force detector, and
wherein, if the jam determination unit determines that a jam has occurred, movement of the robot arm is controlled on the basis of the external force that the robot arm receives from the outside and that is detected by the second force detector.

3. The robot according to claim 2,
wherein the area classification unit stores a map of an operation area including the restricted area beforehand.

4. The robot according to claim 2,
wherein the area classification unit obtains a velocity of movement of the end portion and classifies an area in which the velocity of movement of the end portion is lower than a velocity threshold into the restricted area.

5. The robot according to claim 3,
wherein the restricted area includes a plurality of areas, and
wherein the area classification unit is a directional area classification unit that has information about a direction in which movement of each of the plurality of joints is restricted in each of the plurality of areas.

6. The robot according to claim 5,
wherein one or more of the plurality of joints on which the restriction on movement is to be imposed are determined on the basis of information about the plurality of areas and information about the direction in which movement of each of the plurality of joints is to be restricted, which are stored in the directional area classification unit.

7. The robot according to claim 1,
wherein the restriction on movement is not imposed on at least one of the plurality of joints near the end portion.

8. The robot according to claim 2,
wherein the restriction period setting unit sets a shorter restriction period when the external force detected by the second force detector is larger.

9. The robot according to claim 2, further comprising:
an operator/object determination unit,
wherein the operator/object determination unit determines whether a body jammed between the end portion of the robot arm and the external structure is the operator or the object on the basis of the position information obtained by the position information obtaining unit, the external force that the robot arm receives from the outside and that is detected by the second force detector, and information determined by the jam determination unit, and
wherein, if the operator/object determination unit determines that the body is the operator, the restriction period setting unit sets the restriction period to be shorter than that in a case where the operator/object determination unit determines that the body is the object.

10. The robot according to claim 9,
wherein the second force detector estimates an estimated joint torque from a value of an electric current passing through a driving device of each of the plurality of joints and position information obtained by the position information obtaining unit,
wherein the operator/object determination unit calculates an elastic modulus from the position information obtained by the position information obtaining unit and the estimated joint torque estimated by the second force detector, and
wherein the operator/object determination unit determines that the body that is jammed is the operator if the calculated elastic modulus is less than a first operator-determination threshold and determines that the body that is jammed is the object if the calculated elastic modulus is greater than or equal to the first operator-determination threshold.

11. The robot according to claim 9,
wherein the operator/object determination unit determines that the body that is jammed is the operator if a difference between a maximum value and a minimum value of the external force that the robot arm receives from the outside and that is detected by the second force detector is greater than or equal to a second operator-determination threshold.

12. The robot according to claim 8,
wherein the jam determination unit determines that a jam has occurred if an input from the first force detector is zero and an input from the second force detector is greater than or equal to a certain value.

13. A device for controlling a robot, comprising:
a position information obtaining unit that obtains position information about an end portion of a robot arm having a plurality of joints;
a first force detector that detects a force that an operator applies to the robot arm;
a jam determination unit that determines whether or not the operator or an object is jammed between the robot arm and an external structure on the basis of the force detected by the first force detector;
an area classification unit that classifies an area in which the end portion moves into a restricted area and an unrestricted area; and
a restriction period setting unit that sets a restriction period during which movement of the robot arm is restricted;
a microprocessor that:
imposes movement restriction on, and automatically stopping movement of, one or more of the plurality of joints if an elapsed period after detection of the jam is in the restriction period and the end portion is located in the restricted area, and does not restrict movement of at least one of the plurality of joints excluding the one or more of the plurality of joints,
removes the movement restriction if the elapsed period ends after the restriction period, and does not impose movement restriction on the plurality of joints if the elapsed period after detection of the jam is in the restriction period and the end portion is located in the unrestricted area.

14. A method for controlling a robot with a microprocessor, comprising:
  obtaining position information about an end portion of a robot arm having a plurality of joints;
  detecting a force that an operator applies to the robot arm;
  performing the following with the microprocessor:
    receiving the position information, and force information indicative of the force;
    classifying an area in which the end portion moves into a restricted area and an unrestricted area;
    determining whether or not the operator or an object is jammed between the robot arm and an external structure on the basis of the force information;
    setting a restriction period during which movement of the robot arm is restricted,
    imposing movement restriction on, and automatically stopping movement of, one or more of the plurality of joints if an elapsed period after detection of the jam is in the restriction period and the end portion is located in the restricted area, and not restricting movement of at least one of the plurality of joints excluding the one or more of the plurality of joints,
    removing the movement restriction if the elapsed period ends after the restriction period, and
    not imposing movement restriction on the plurality of joints if the elapsed period after detection of the jam is in the restriction period and the end portion is located in the unrestricted area.

15. A computer-readable non-transitory recording medium storing a program for causing a computer to perform operations, the operations including:
  obtaining position information about an end portion of a robot arm having a plurality of joints;
  detecting a force that an operator applies to the robot arm;
  receiving the position information, and force information indicative of the force;
  classifying an area in which the end portion moves into a restricted area and an unrestricted area;
  determining whether or not the operator or an object is jammed between the robot arm and an external structure on the basis of the force information;
  setting a restriction period during which movement of the robot arm is restricted,
  imposing movement restriction on, and automatically stopping movement of, one or more of the plurality of joints if an elapsed period after detection of the jam is in the restriction period and the end portion is located in the restricted area, and not restricting movement of at least one of the plurality of joints excluding the one or more of the plurality of joints,
  removing the movement restriction if the elapsed period ends after the restriction period, and
  not imposing movement restriction on the plurality of joints if the elapsed period after detection of the jam is in the restriction period and the end portion is located in the unrestricted area.

* * * * *